United States Patent
Suiter et al.

(10) Patent No.: US 10,839,219 B1
(45) Date of Patent: Nov. 17, 2020

(54) SYSTEM FOR CURATION, DISTRIBUTION AND DISPLAY OF LOCATION-DEPENDENT AUGMENTED REALITY CONTENT

(71) Applicant: Pipbin, Inc., Omaha, NE (US)

(72) Inventors: Maximillian John Suiter, Omaha, NE (US); Scott David Morrison, Columbus, MT (US); Valerie Michele Morrison, Columbus, MT (US); Ian Padraic Suiter, Omaha, NE (US); Sean Patrick Suiter, Omaha, NE (US)

(73) Assignee: Pipbin, Inc., Omaha, NE (US)

( * ) Notice: Subject to any disclaimer, the term of this patent is extended or adjusted under 35 U.S.C. 154(b) by 0 days.

(21) Appl. No.: 16/155,661

(22) Filed: Oct. 9, 2018

Related U.S. Application Data

(63) Continuation of application No. 15/469,245, filed on Mar. 24, 2017, now Pat. No. 10,108,859, and a
(Continued)

(51) Int. Cl.
  *G06K 9/00* (2006.01)
  *G06F 40/169* (2020.01)
  (Continued)

(52) U.S. Cl.
  CPC .......... *G06K 9/00684* (2013.01); *G06F 3/011* (2013.01); *G06F 40/169* (2020.01);
  (Continued)

(58) Field of Classification Search
  CPC ........... G06K 9/00684; G06K 9/00671; H04N 5/23293; H04W 4/025; G06T 19/006; G06F 3/011; G06F 17/241; G06F 40/169
  See application file for complete search history.

(56) References Cited

U.S. PATENT DOCUMENTS

| 4,581,634 A | 4/1986 | Williams |
| 4,975,690 A | 12/1990 | Torres |
(Continued)

FOREIGN PATENT DOCUMENTS

| CA | 2804096 C | 1/2012 |
| CA | 2863124 A1 | 7/2015 |
(Continued)

OTHER PUBLICATIONS

A Whole New Story, [Online]. Retrieved from the Internet: <https://www.snap.com/en-US/news/>, (2017), 13 pgs.
(Continued)

*Primary Examiner* — Albert H Cutler
(74) *Attorney, Agent, or Firm* — Suiter Swantz pc llo

(57) ABSTRACT

An augmented reality moment file represented by an augmented reality icon recordable and readable by a handy having a processor in proximity to the locus of a recorded moment file configured to receive an augmented reality moment file. The content of the augmented reality moment file is preferably assessable via a user selectable icon either representative of a user, location, and/or theme. The icon assessable user created content moment file, in addition to content and a position, preferably also includes recorder identification, a recorded time, an expiration, and media such as text, an image, a video, a sound recording, a game play instruction, a game play move, and/or a setup menu.

15 Claims, 21 Drawing Sheets

Related U.S. Application Data continuation-in-part of application No. 15/231,241, filed on Aug. 8, 2016, now Pat. No. 10,334,134.

(60) Provisional application No. 62/352,433, filed on Jun. 20, 2016.

(51) Int. Cl.
*H04N 5/232* (2006.01)
*G06F 3/01* (2006.01)
*H04W 4/02* (2018.01)
*G06T 19/00* (2011.01)

(52) U.S. Cl.
CPC ........ *G06K 9/00671* (2013.01); *G06T 19/006* (2013.01); *H04N 5/23293* (2013.01); *H04W 4/025* (2013.01)

(56) References Cited

U.S. PATENT DOCUMENTS

| | | |
|---|---|---|
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Ben-Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,349,203 B1 | 2/2002 | Asaoka et al. |
| 6,446,004 B1 | 9/2002 | Cao et al. |
| 6,449,657 B2 | 9/2002 | Stanbach, Jr. et al. |
| 6,456,852 B2 | 9/2002 | Bar et al. |
| 6,484,196 B1 | 11/2002 | Maurille |
| 6,523,008 B1 | 2/2003 | Avrunin et al. |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,257 B1 | 1/2004 | Camut et al. |
| 6,698,020 B1 | 2/2004 | Zigmond et al. |
| 6,700,506 B1 | 3/2004 | Winkler et al. |
| 6,724,403 B1 | 4/2004 | Santoro et al. |
| 6,757,713 B1 | 6/2004 | Ogilvie et al. |
| 6,834,195 B2 | 12/2004 | Brandenberg et al. |
| 6,836,792 B1 | 12/2004 | Chen |
| 6,898,626 B2 | 5/2005 | Ohashi |
| 6,970,088 B2 | 11/2005 | Kovach |
| 6,980,909 B2 | 12/2005 | Root et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,203,380 B2 | 4/2007 | Chiu et al. |
| 7,206,568 B2 | 4/2007 | Sudit |
| 7,227,937 B1 | 6/2007 | Yoakum et al. |
| 7,269,426 B2 | 9/2007 | Kokkonen et al. |
| 7,315,823 B2 | 1/2008 | Brondrup |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,607,096 B2 | 10/2009 | Oreizy et al. |
| 7,639,943 B1 | 12/2009 | Kalajan |
| 7,668,537 B2 | 2/2010 | De Vries |
| 7,770,137 B2 | 8/2010 | Forbes et al. |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 8,001,204 B2 | 8/2011 | Burtner et al. |
| 8,082,255 B1 | 12/2011 | Carlson, Jr. et al. |
| 8,098,904 B2 | 1/2012 | Ioffe et al. |
| 8,099,109 B2 | 1/2012 | Altman et al. |
| 8,131,597 B2 | 3/2012 | Hudetz et al. |
| 8,135,166 B2 | 3/2012 | Rhoads et al. |
| 8,136,028 B1 | 3/2012 | Loeb et al. |
| 8,146,001 B1 | 3/2012 | Reese |
| 8,161,417 B1 | 4/2012 | Lee |
| 8,195,203 B1 | 6/2012 | Tseng |
| 8,214,443 B2 | 7/2012 | Hamburg |
| 8,276,092 B1 | 9/2012 | Narayanan et al. |
| 8,279,319 B2 | 10/2012 | Date |
| 8,285,199 B2 | 10/2012 | Hsu et al. |
| 8,306,922 B1 | 11/2012 | Kunal et al. |
| 8,312,097 B1 | 11/2012 | Siegel et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,405,773 B2 | 3/2013 | Hayashi et al. |
| 8,418,067 B2 | 4/2013 | Cheng et al. |
| 8,471,914 B2 | 6/2013 | Sakiyama et al. |
| 8,472,935 B1 | 6/2013 | Fujisaki |
| 8,560,612 B2 | 10/2013 | Kilmer et al. |
| 8,639,803 B2 | 1/2014 | Moritz et al. |
| 8,660,358 B1 | 2/2014 | Bergboer et al. |
| 8,660,793 B2 | 2/2014 | Ngo et al. |
| 8,694,026 B2 | 4/2014 | Forstall et al. |
| 8,718,333 B2 | 5/2014 | Wolf et al. |
| 8,744,523 B2 | 6/2014 | Fan et al. |
| 8,761,800 B2 | 6/2014 | Kuwahara |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,909,725 B1 | 12/2014 | Sehn |
| 8,910,081 B2 | 12/2014 | Fennel |
| 8,948,935 B1 | 2/2015 | Peeters et al. |
| 9,015,285 B1 | 4/2015 | Ebsen et al. |
| 9,040,574 B2 | 5/2015 | Wang et al. |
| 9,104,293 B1 | 8/2015 | Kornfeld et al. |
| 9,131,342 B2 | 9/2015 | Forstall et al. |
| 9,152,477 B1 | 10/2015 | Campbell et al. |
| 9,225,897 B1 | 12/2015 | Sehn |
| 9,258,373 B2 * | 2/2016 | Harris ............... H04W 4/21 |
| 9,258,459 B2 | 2/2016 | Hartley |
| 9,396,354 B1 | 7/2016 | Murphy et al. |
| 9,430,783 B1 | 8/2016 | Sehn |
| 9,459,778 B2 | 10/2016 | Hogeg et al. |
| 9,521,515 B2 | 12/2016 | Zimerman et al. |
| 9,537,811 B2 | 1/2017 | Allen et al. |
| 9,584,694 B2 | 2/2017 | Ito et al. |
| 9,626,070 B2 | 4/2017 | Cowles et al. |
| 9,628,950 B1 | 4/2017 | Noeth et al. |
| 9,652,896 B1 | 5/2017 | Jurgenson et al. |
| 9,681,265 B1 | 6/2017 | Davis et al. |
| 9,710,554 B2 | 7/2017 | Sandberg |
| 9,736,371 B2 | 8/2017 | Taneichi et al. |
| 9,736,518 B2 | 8/2017 | Houston et al. |
| 9,754,355 B2 | 9/2017 | Chang et al. |
| 9,756,373 B2 | 9/2017 | Houston et al. |
| 9,792,876 B2 | 10/2017 | Xie et al. |

(56) References Cited

U.S. PATENT DOCUMENTS

| | | |
|---|---|---|
| 9,823,803 B2 | 11/2017 | Tseng |
| 9,843,720 B1 | 12/2017 | Ebsen et al. |
| 9,852,543 B2 | 12/2017 | Hare et al. |
| 9,854,219 B2 | 12/2017 | Sehn |
| 9,881,094 B2 | 1/2018 | Pavlovskaia et al. |
| 9,936,333 B2 | 4/2018 | Lau et al. |
| 9,978,125 B1 | 5/2018 | Chang et al. |
| 9,984,499 B1 | 5/2018 | Jurgenson et al. |
| 10,055,895 B2 | 8/2018 | Li et al. |
| 10,078,863 B2 * | 9/2018 | Loganathan ............ G06Q 20/12 |
| 10,083,245 B1 | 9/2018 | Jezewski |
| 10,102,423 B2 | 10/2018 | Shaburov et al. |
| 10,102,447 B1 | 10/2018 | Gusarov |
| 10,108,859 B1 * | 10/2018 | Suiter ................ H04N 5/23293 |
| 10,123,166 B2 | 11/2018 | Zimerman et al. |
| 10,135,949 B1 | 11/2018 | Pavlovskaia et al. |
| 10,157,333 B1 | 12/2018 | Wang et al. |
| 10,203,855 B2 | 2/2019 | Al Majid et al. |
| 10,206,059 B1 | 2/2019 | Tseng |
| 10,219,111 B1 | 2/2019 | Chen et al. |
| 10,223,397 B1 | 3/2019 | Sehn et al. |
| 10,229,717 B1 | 3/2019 | Davis |
| 10,244,186 B1 | 3/2019 | Chen et al. |
| 10,270,839 B2 | 4/2019 | Andreou et al. |
| 10,285,001 B2 | 5/2019 | Allen et al. |
| 10,311,916 B2 | 6/2019 | Sehn |
| 10,318,574 B1 * | 6/2019 | Bonechi .............. G06F 3/04842 |
| 10,319,149 B1 | 6/2019 | Cowburn et al. |
| 10,327,096 B1 | 6/2019 | Ahmed et al. |
| 10,338,773 B2 | 7/2019 | Murarka et al. |
| 10,339,365 B2 | 7/2019 | Gusarov et al. |
| 10,349,209 B1 | 7/2019 | Noeth et al. |
| 10,354,425 B2 | 7/2019 | Yan et al. |
| 10,360,708 B2 | 7/2019 | Bondich et al. |
| 10,366,543 B1 | 7/2019 | Jurgenson et al. |
| 10,382,373 B1 | 8/2019 | Yang et al. |
| 10,387,514 B1 | 8/2019 | Yang et al. |
| 10,387,730 B1 | 8/2019 | Cowburn et al. |
| 10,397,469 B1 | 8/2019 | Yan et al. |
| 10,402,650 B1 | 9/2019 | Suiter et al. |
| 10,423,983 B2 | 9/2019 | Shim et al. |
| 10,430,838 B1 | 10/2019 | Andreou |
| 10,448,201 B1 | 10/2019 | Sehn et al. |
| 2002/0047868 A1 | 4/2002 | Miyazawa |
| 2002/0087631 A1 | 7/2002 | Sharma |
| 2002/0097257 A1 | 7/2002 | Miller et al. |
| 2002/0122659 A1 | 9/2002 | McGrath et al. |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0052925 A1 | 3/2003 | Daimon et al. |
| 2003/0126215 A1 | 7/2003 | Udell et al. |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson et al. |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0032244 A1 | 2/2007 | Counts et al. |
| 2007/0040931 A1 | 2/2007 | Nishizawa |
| 2007/0073517 A1 | 3/2007 | Panje |
| 2007/0073823 A1 | 3/2007 | Cohen |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0076505 A1 | 3/2008 | Nguyen et al. |
| 2008/0092233 A1 | 4/2008 | Tian et al. |
| 2008/0104503 A1 | 5/2008 | Beall et al. |
| 2008/0109844 A1 | 5/2008 | Baldeschwieler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0207176 A1 | 8/2008 | Brackbill et al. |
| 2008/0214210 A1 | 9/2008 | Rasanen et al. |
| 2008/0222545 A1 | 9/2008 | Lemay et al. |
| 2008/0256446 A1 | 10/2008 | Yamamoto |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089710 A1 | 4/2009 | Wood et al. |
| 2009/0093261 A1 | 4/2009 | Ziskind et al. |
| 2009/0132341 A1 | 5/2009 | Klinger et al. |
| 2009/0132453 A1 | 5/2009 | Hangartner et al. |
| 2009/0132665 A1 | 5/2009 | Thomsen et al. |
| 2009/0153492 A1 | 6/2009 | Popp |
| 2009/0157450 A1 | 6/2009 | Athsani et al. |
| 2009/0160970 A1 | 6/2009 | Fredlund et al. |
| 2009/0163182 A1 | 6/2009 | Gatti et al. |

(56) References Cited

U.S. PATENT DOCUMENTS

| | | |
|---|---|---|
| 2009/0192900 A1 | 7/2009 | Collison et al. |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0113065 A1 | 5/2010 | Narayan et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0185552 A1 | 7/2010 | DeLuca et al. |
| 2010/0185665 A1 | 7/2010 | Horn et al. |
| 2010/0198683 A1 | 8/2010 | Aarabi |
| 2010/0198694 A1 | 8/2010 | Muthukrishnan |
| 2010/0198828 A1 | 8/2010 | Petersen et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | DAngelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0225069 A1 | 9/2011 | Cramer et al. |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf et al. |
| 2011/0320373 A1 | 12/2011 | Lee et al. |
| 2012/0001938 A1* | 1/2012 | Sandberg ............... H04W 4/21 345/633 |
| 2012/0028659 A1 | 2/2012 | Whitney et al. |
| 2012/0036015 A1 | 2/2012 | Sheikh |
| 2012/0059722 A1 | 3/2012 | Rao |
| 2012/0062805 A1 | 3/2012 | Candelore |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco et al. |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0210244 A1 | 8/2012 | de Francisco Lopez et al. |
| 2012/0212632 A1 | 8/2012 | Mate et al. |
| 2012/0220264 A1 | 8/2012 | Kawabata |
| 2012/0231814 A1 | 9/2012 | Calman et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0268490 A1 | 10/2012 | Sugden |
| 2012/0278387 A1 | 11/2012 | Garcia et al. |
| 2012/0278692 A1 | 11/2012 | Shi |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0323933 A1 | 12/2012 | He et al. |
| 2013/0006759 A1 | 1/2013 | Srivastava et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0095857 A1 | 4/2013 | Garcia et al. |
| 2013/0128059 A1 | 5/2013 | Kristensson |
| 2013/0129252 A1 | 5/2013 | Lauper et al. |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0201182 A1* | 8/2013 | Kuroki ................... G06T 19/20 345/419 |
| 2013/0218965 A1 | 8/2013 | Abrol et al. |
| 2013/0218968 A1 | 8/2013 | McEvilly et al. |
| 2013/0222323 A1 | 8/2013 | McKenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0290443 A1 | 10/2013 | Collins et al. |
| 2013/0311255 A1 | 11/2013 | Cummins et al. |
| 2013/0325964 A1 | 12/2013 | Berberat |

(56) References Cited

U.S. PATENT DOCUMENTS

| | | |
|---|---|---|
| 2013/0344896 A1 | 12/2013 | Kirmse et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0045530 A1 | 2/2014 | Gordon et al. |
| 2014/0046923 A1 | 2/2014 | Ruble et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0096029 A1 | 4/2014 | Schultz |
| 2014/0114565 A1 | 4/2014 | Aziz et al. |
| 2014/0118483 A1 | 5/2014 | Rapoport et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0139519 A1 | 5/2014 | Mit |
| 2014/0143060 A1 | 5/2014 | Fernandez |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173457 A1 | 6/2014 | Wang et al. |
| 2014/0189592 A1 | 7/2014 | Benchenaa et al. |
| 2014/0204117 A1 | 7/2014 | Kinnebrew et al. |
| 2014/0207679 A1 | 7/2014 | Cho |
| 2014/0214471 A1 | 7/2014 | Schreiner |
| 2014/0237578 A1* | 8/2014 | Bryant .............. G06F 3/04845 726/7 |
| 2014/0253743 A1 | 9/2014 | Loxam et al. |
| 2014/0258405 A1 | 9/2014 | Perkin |
| 2014/0266703 A1 | 9/2014 | Dailey, Jr. et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | OKeefe et al. |
| 2014/0289833 A1 | 9/2014 | Briceno et al. |
| 2014/0324627 A1 | 10/2014 | Haver et al. |
| 2014/0325383 A1 | 10/2014 | Brown et al. |
| 2014/0372945 A1 | 12/2014 | Fan et al. |
| 2015/0029180 A1 | 1/2015 | Komatsu |
| 2015/0046278 A1 | 2/2015 | Pei et al. |
| 2015/0087263 A1 | 3/2015 | Branscomb |
| 2015/0088622 A1 | 3/2015 | Ganschow |
| 2015/0116529 A1 | 4/2015 | Wu et al. |
| 2015/0169827 A1 | 6/2015 | LaBorde |
| 2015/0172534 A1 | 6/2015 | Miyakawa et al. |
| 2015/0222814 A1 | 8/2015 | Li et al. |
| 2015/0261917 A1 | 9/2015 | Smith |
| 2015/0350136 A1 | 12/2015 | Flynn et al. |
| 2015/0356063 A1* | 12/2015 | Jiang .................. H04L 67/38 715/232 |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0180602 A1* | 6/2016 | Fuchs .................. A63F 13/26 463/31 |
| 2016/0180887 A1 | 6/2016 | Sehn |
| 2016/0182422 A1 | 6/2016 | Sehn |
| 2016/0182875 A1 | 6/2016 | Sehn |
| 2016/0212538 A1 | 7/2016 | Fullam et al. |
| 2016/0223335 A1* | 8/2016 | Tabata .................. G01C 21/20 |
| 2016/0253560 A1 | 9/2016 | Tokutake |
| 2016/0277419 A1 | 9/2016 | Allen et al. |
| 2016/0283595 A1 | 9/2016 | Folkens et al. |
| 2016/0335289 A1* | 11/2016 | Andrews .............. G06Q 50/16 |
| 2017/0006094 A1 | 1/2017 | Abou Mahmoud et al. |
| 2017/0021273 A1* | 1/2017 | Rios .................. A63F 13/332 |
| 2017/0061490 A1 | 3/2017 | Chahremani et al. |
| 2017/0079001 A1 | 3/2017 | Lewis |
| 2017/0132267 A1 | 5/2017 | Zhou et al. |
| 2017/0150037 A1 | 5/2017 | Rathod |
| 2017/0185869 A1 | 6/2017 | Dua et al. |
| 2017/0193300 A1 | 7/2017 | Shatz et al. |
| 2017/0201803 A1 | 7/2017 | Wald et al. |
| 2017/0208109 A1 | 7/2017 | Akselrod et al. |
| 2017/0256097 A1 | 9/2017 | Finn et al. |
| 2017/0270141 A1 | 9/2017 | Greenberger |
| 2018/0026925 A1 | 1/2018 | Kennedy |
| 2018/0072833 A1 | 3/2018 | Chang et al. |
| 2018/0116346 A1 | 5/2018 | Hertlein |
| 2018/0129905 A1 | 5/2018 | Soundararajan et al. |
| 2019/0205078 A1 | 7/2019 | Sueki et al. |
| 2019/0272567 A1 | 9/2019 | Vigier et al. |

FOREIGN PATENT DOCUMENTS

| | | |
|---|---|---|
| CA | 2887596 A1 | 7/2015 |
| CN | 102238275 B | 11/2011 |
| CN | 102447779 A | 5/2012 |
| CN | 103595911 A | 2/2014 |
| EP | 2051480 A1 | 4/2009 |
| EP | 2151797 A1 | 2/2010 |
| EP | 2732383 B1 | 4/2018 |
| EP | 2602729 B1 | 10/2018 |
| EP | 2589024 B1 | 8/2019 |
| GB | 2399928 A | 9/2004 |
| JP | 6082005 B2 | 2/2017 |
| KR | 19990073076 A | 10/1999 |
| WO | 1996024213 A1 | 10/1999 |
| WO | 1999063453 A1 | 10/1999 |
| WO | 2001029642 A1 | 10/1999 |
| WO | 2001050703 A2 | 10/1999 |
| WO | 2006118755 A2 | 11/2006 |
| WO | 2009043020 A2 | 4/2009 |
| WO | 2011080385 A1 | 7/2011 |
| WO | 2011119407 A1 | 9/2011 |
| WO | 2013008238 A1 | 1/2013 |
| WO | 2013045753 A1 | 4/2013 |
| WO | 2014115136 A1 | 7/2014 |
| WO | 2014194262 A2 | 12/2014 |
| WO | 2016065131 A1 | 4/2016 |

OTHER PUBLICATIONS

Adding a watermark to your photos, eBay, [Online]. Retrieved from the Intenet URL:http://pages.ebay.com/help/sell/pictures.html, (accessed May 24, 2017), 4 pgs.

Tripathi, Rohit, "Watermark Images in PHP and Save File on Server", [Online]. Retrieved from the Internet: URL:http://code.rohitink.com/2012/12/28/watermark-images-in-php-and-save-file-on-served, (Dec. 28, 2012), 4 pgs.

BlogStomp, [Online]. Retrieved from the Internet: URL:http://stompsoftware.com/blogstomp, (accessed May 24, 2017), 12 pgs.

Cup Magic Starbucks Holiday Red Cups come to life with AR app, [Online]. Retrieved from the Internet: http://www.blastradius.com/work/cup-magic, (2016), 7 pgs.

Daily App: InstaPlace (iOS/Android): Give Pictures a Sense of Place, TechPP, [Online]. Retrieved from the Internet: URL;http://techpp.com/2013/02/15/instaplace-app-review, (2013), 13 pgs.

How Snaps Are Stored and Deleted, Snapchat, [Online]. Retrieved from the Internet: URL: https://web.archive.org/web/20130607042322/http://blog.snapchat.com/post/50060403002/how-snaps-are-stored-and-deleted, (May 9, 2013), 2 pgs.

Shein, Esther, "Ephemeral Data", Communications of the ACM vol. 56 | No. 9, (Sep. 2013), 20-22.

International Application Serial No. PCT/US2014/040346, International Search Report dated Mar. 23, 2015, 2 pgs.

International Application Serial No. PCT/US2014/040346, Written Opinion dated Mar. 23, 2015, 6 pgs.

International Application Serial No. PCT/US2015/037251, International Search Report dated Sep. 29, 2015, 7 pgs.

Introducing Snapchat Stories, [Online]. Retrieved from the Internet:https://www.youtube.com/watch?v=-ie5_aaHOhE, (Oct. 1, 2013), 92 pgs.

(56) References Cited

OTHER PUBLICATIONS

Visit Mobile Getting Started, IVISIT, (Dec. 4, 2013), 1-16.
Macys Believe-o-Magic, [Online]. Retrieved from the Internet: https://www.youtube.com/watch?v=5p7-y5eO6X4, Nov. 27, 2011), 102 pgs.
Macys Introduces Augmented Reality Experience in Stores across Country as Part of Its 2011 Believe"Campaign", [Online]. Retrieved from the Internet: http://www.businesswire.com/news/home/20111102006759/en/Macy%E2%80%99s-Introduces-Augmented-Reality-Experience-Stores-Country ., (Nov. 2, 2011), 6 pgs.
Starbucks Cup Magic for Valentines Day, {Online}. Retrieved from the Internet: https://www.youtube.com/watchv=8nvgOzjgl0w , (Feb. 6, 2012), 88 pgs.
Starbucks Cup Magic, {Onliine}. Retrieved from the Internet: https://www.youtube.com/watchv=RWwQXi9RG0w , (Nov. 8, 2011), 87 pgs.
Starbucks Holiday Red Cups Come to Life, Signaling the Return of the Merriest Season, [Online]. Retrieved from the Internet: http://www.businesswire.com/news/home/20111115005744/en/2479513/Starbucks-Holiday-Red-Cups-Life-Signaling-Return , (Nov. 15, 2011), 5 pgs.
U.S. Appl. No. 14/494,226, Examiner Interview Summary dated Oct. 27, 2016, 3 pgs.
U.S. Appl. No. 14/494,226, Final Office Action dated Mar. 7, 2017, 33 pgs.
U.S. Appl. No. 14/494,226, Non Final Office Action dated Sep. 12, 2016, 32 pgs.
U.S. Appl. No. 14/494,226, Response filed Dec. 12, 2016 to Non Final Office Action dated Sep. 12, 2016, 16 pgs.
U.S. Appl. No. 14/539,391, Notice of Allowance dated Mar. 5, 2015, 16 pgs.
U.S. Appl. No. 14/682,259, Notice of Allowance dated Jul. 27, 2015, 17 pgs.
InstaPlace Photo App Tell the Whole Story, [Online]. Retrieved from the Internet; https://www.youtube.com/watch?v=uF_gFkg1hBM , (Nov. 8, 2013), 113 pgs.
Carthy, Roi, "Dear All Photo Apps: Mobli Just Won Filters", [Online]. Retrieved from the Internet: URL https://techcrunch.com/2011/09/08/mobli-filters , (Sep. 8, 2011), 10 pgs.
Janthong, Isaranu, "Android App Review Thailand", [Online]. Retrieved from the Internet http://www.android-free-app-review.com/2013/01/instaplace-android-google-play-store.html , (Jan. 23, 2013), 9 pgs.
Leyden, John, "This SMS will self-destruct in 40 seconds", [Online]. Retrieved from the Internet: URL: http://www.the register.co.uk/2005/12/12/stealthtext/, (Dec. 12, 2005), 1 pg.
Macleod, Duncan, "Macys Believe-o-Magic App", [Online]. Retrieved from the Internet: URL:http://theinspirationroom.com/daily/2011/macys-believe-o-magic-app , (Nov. 14, 2011), 10 pgs.
Macleod, Duncan, "Starbucks Cup Magic—Lets Merry", [Online]. Retrieved from the Internet: URL; http://theinspirationroom.com/daily/2011/starbucks-cup-magic , (Nov. 12, 2011), 8 pgs.
Melanson, Mike, "This text message will self destruct in 60 seconds", readwrite.com, [Online]. Retrieved from the Internet: http://readwrite.com/2011/02/11/this-text-message-will-self-destruct-in-60 seconds , (Feb. 18, 2015).
Notopoulos, Katie, "A Guide to the New Snapchat Filters and Big Fonts", [Online]. Retrieved from the Internet: https://www.buzzfeed.com/katienotopoulos/a-guide-to-the-new-snapchat-tilters-and-big-fontsut-term=.bkQ9qVZWe#.nv58YXpkV , (Dec. 22, 2013), 13 pgs.
Panzarino, Matthew, "Snapchat Adds Filters, A Replay Function and for Whatever Reason, Time, Temperature and Speed Overlays", [Online]. Retrieved from the Internet: https://techcrunch.com/2013/12/20/snapchat-adds-filters-new-font-and-for-some-reason-time-temperature-and-speed-overlays/ , (Dec. 20, 2013), 12 pgs.
Sawers, Paul, "Snapchat for iOS Lets You Send Photos to Friends and Set How long Theyre Visible for", [Online]. Retrieved from the Internet: http:/ /thenextweb.com/apps/2012/05/07/Snapchat-for-ios-lets-you-send-photos-to-friends-and-set-how-long-theyre-visiblefor/#xCjrp , (May 7, 2012), 1-5.
Collins, Katie, "Leave digital gifts in physical locations with Traces app", http://www.wired.cauk/article/traces-messaging-app, Wired UK, Traces, Aug. 5, 2014, pp. 1-11.
Knibbs, Kate, "Is this the first anonymous app that understands the power of secrets?", https://www.dailydot.com/debut/yip-yak-app/, The Daily Dot, Mar. 8, 2017, pp. 1-8.
Lawler, Ryan, "Whisper Confirms $36M in New Funding, Adds Related Posts, Categories, and Explore Feature to App", https://techcrunch.com/2014/05/19/whisper-v4/, TechCrunch, May 19, 2014, pp. 1-7.
Martellaro, John, "Spyglass for iOS: Powerful Navigational Instrument", https://www.macobserver.com/tmo/review/spyglass_for_ios_powerful_navigational_instrument, The Mac Observer, Jun. 27, 2011, pp. 1-10.
Jardin, Xeni, "Pip, new minimalist messaging app, promises easy update to friends", https://boingboing.net/2014/12-04/pip-new-minimalist-messaging.html, Boing Boing, pp. 1-7.

* cited by examiner

US 10,839,219 B1

SYSTEM FOR CURATION, DISTRIBUTION AND DISPLAY OF LOCATION-DEPENDENT AUGMENTED REALITY CONTENT

CROSS-REFERENCE TO RELATED APPLICATIONS

The instant application claims priority under 35 U.S.C. § 120 as a continuation of U.S. patent application Ser. No. 15/469,245 filed Mar. 24, 2017. The instant application claims priority under 35 U.S.C. § 120 as a continuation-in-part of U.S. patent application Ser. No. 15/231,241 filed Aug. 8, 2016, which application in turn claims priority under 35 U.S.C § 119 to U.S. Provisional Patent Application 62/352,433 filed Jun. 20, 2016.

Said U.S. patent application Ser. Nos. 15/469,245; 15/231,241; and 62/352,433 are herein incorporated by reference in their entirety.

TECHNICAL FIELD

The present invention is generally related to apparatus and systems for sending messages and more particularly to a system and apparatus for constructing and sharing an augmented interactive landscape or the like. The present invention provides Location Based Media (LBM or LoBaM) and provides Augmented Reality Location Based Media (AR-LBM).

SUMMARY OF THE INVENTION

The present disclosure teaches a device (e.g., a handy) allowing users to augment the environment with media files accessible and identified by an icon tagged to a particular location or object and accessible by users proximate to the tagged location (sometimes hereinafter "Location Based Media" or "(LBM)").

Individuals interact with their environment on a continual basis. Certain moments may occur where an interaction with a place, thing, person, article, thought, feeling, or the like may occur. Such moments, indeed all moments, are multi-dimensional and/or multisensory. Each moment, whether ignored or passed without notice, or contemplated, generally includes all the senses of a person, a time and date, a location, an orientation, and a set of things involved in the moment, e.g., a sound, a song, a video, some text, a conversation, a three-dimensional object, a place, a person, or group of people, a landscape, a view, or the like. Such moments produce thoughts and or feelings. Recording such moments for sharing and hermeneutics (context) for a particular set of circumstances is desirable. A moment may be a simple reminder or a multidimensional (multisensory) reminder (one which generates a mood or feeling) or for communicating the feelings attached to the context of experiencing a particular moment to a select group of friends, a filtered audience or broadcast unfiltered to complete strangers.

An augmented reality moment file which is represented by an augmented reality icon recordable and readable by a handy having a processor in proximity to the locus of a recorded moment file configured to receive an augmented reality moment file. The content of the augmented reality moment file is preferably a user selectable icon either representative of a user, location, and/or theme. The icon assessable user created content moment file, in addition to content and a position, preferably also includes recorder identification, a recorded time, an expiration, and media such as text, an image, a video, a sound recording, a game play instruction, a game play move, navigation instructions, geocache instructions, and/or a setup menu.

In one embodiment of the present invention a recording of a moment may be shared with a party that has moved near or to the location from which a particular moment (encounter) was recorded (placed). Likewise, a time, thing, person, object or position may recall a recorded moment to another. In operation, an enrolled handy or the like (smart device, iPhone, iPad, tablet, Android device, Surface, optical head mounted display or eyewear, or other portable electronic device) may be utilized to record and read/view/experience a moment.

A person carrying an enrolled handy or the like while traveling, eating, walking, working, driving (passenger), traveling, and otherwise living may record the embodied experiences of a moment (or interaction) with a video, song, menu, image, video, conversation, story, interactive moment element, or the like, tagged to a particular location, orientation, and time. Interesting (suitable/desired) moment files may be located via both tangible and intangible aspects of a recorded moment (experienced/shared) by an in situ user by location, tagged object, and the like. Additionally, the context of a recorded moment may be searchable by time, location, orientation, type, mood (humorous, informative, poignant, opinion, historical, idiohistoric, and others) and filtered by an in situ user (or remote users in special embodiments of the present invention).

When necessary measurements by an inertial measurement unit (IMU) of an enrolled handy may be utilized to determine a location and orientation of the enrolled handy. In this manner a moment may be recorded/read either with or without the presence of an externally transmitted positioning signal. The system capable of identifying a location and orientation of a portable user handy may map user moments to a virtual property ownership system where use of the system may be monetized.

In a presently preferred embodiment, the invention may work and employ virtual and augmented reality standards as they develop and are deployed such that objects/things and the like may be paired with a tagged location (message) and orientation of an enrolled handy.

BRIEF DESCRIPTION OF THE DRAWINGS

The numerous objects and advantages of the present invention may be better understood by those skilled in the art by reference to the accompanying figures in which:

FIG. 11 is an environmental diagram of an embodiment of the present invention utilized in a museum or the like;

FIG. 12 is an environmental diagram of an embodiment of the present invention utilized in a retail store or the like;

DETAILED DESCRIPTION OF THE INVENTION

Figure 1:
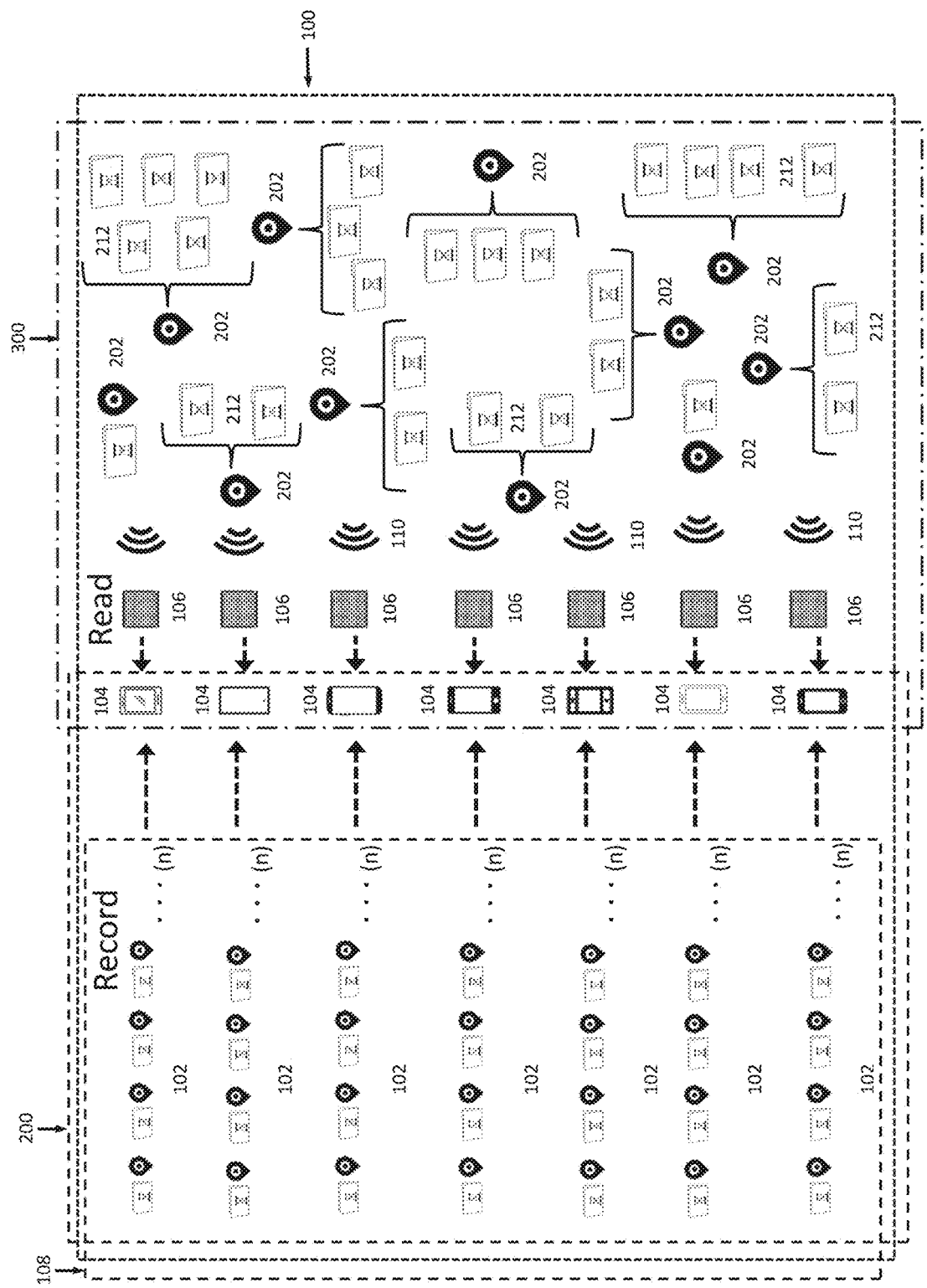
FIG. 1 is a highly diagrammatic environmental view of the moment recorder and reader network of an embodiment of the present invention.

Reference will now be made in detail to exemplary embodiments of the disclosure, examples of which are illustrated in the accompanying drawings.

The instant disclosure describes an apparatus, method, and system for recording moments 10 via a moment system 100. The moment system 100 includes a plurality of moment recorders 200 for recording moment files 102 to a server 108 (or the like). Each moment file 102 may include media 212 tagged with a location 202, a time 204, and an orientation 205 of an enrolled handy 104. An embodiment of the moment 10 may also include a locomotive source 208 and theme 210.

Moment files 102 are associated with a location 202 (e.g., object 122 or place 206), a time 204, and an orientation 205 of an enrolled handy 104. Users 12 may tag objects 122 and places 206 to leave media 212 and the like for other users 12. The present invention allows users to filter, follow, share, inform, opine, and exchange ideas and moments 10 interesting to themselves and others. It is noted that moments 10 may be filterably selected in a variety of ways including being selected from at least one of a class, a category, and a theme of moments.

Turning first to FIG. 1, a plurality of enrolled handys 104 (or the like) may be networked 110 in an embodiment of the present invention for recording 200 and reading 300 moments 10 by subscribed users 12 using enrolled handys 104. Moments 10 are recorded 200 in a file 102 (on a server 108 or the like) tagged to a location 202 (object 122, place 206 or the like) and includes a time 204 (date, time of day), orientation 205 (a pitch, a yaw, and a roll) of an enrolled handy 104 that records the moment 10, and identification information for the user recording the moment. Each moment 10 is created via an enrolled handy 104 or the like by directing the enrolled handy 104 to a place 206 (object 122, location 202) to record the coordinates of the location 206, the time 204, and orientation 205 of the enrolled handy 104. A user 12 may then associate the moment 10 and the tagged location and orientation coordinate set with media 212. Moments 10 may additionally include tokens, games, instructions, memories, memorabilia, advertisements, and the like.

Each enrolled handy 104 may include a camera, a speaker, a display, a position and orientation identification system, a memory, a wireless connection to a server, a text input, a sound input, a global navigation satellite system (GNSS) receiver, and an inertial measurement unit (IMU). It is noted that the display allows a user 12 to display a field of view of the camera, display content, and display content context.

Each enrolled handy 104 may include a user selectable icon for selectably reading and recording an augmented reality moment file 102 positioned in an orientation 205 and location 202 as at least one of a tagged object and a location 202 viewable within the display of the handy 104 when the handy 104 is oriented and located in the locus and orientation 205 of said augmented reality moment file 102. In one embodiment, the locus is a circle centered on a location 202 of a moment 10. For example, a user 12 may define the radius of a locus circle centered on the location 202 of a moment 10.

Figure 2:
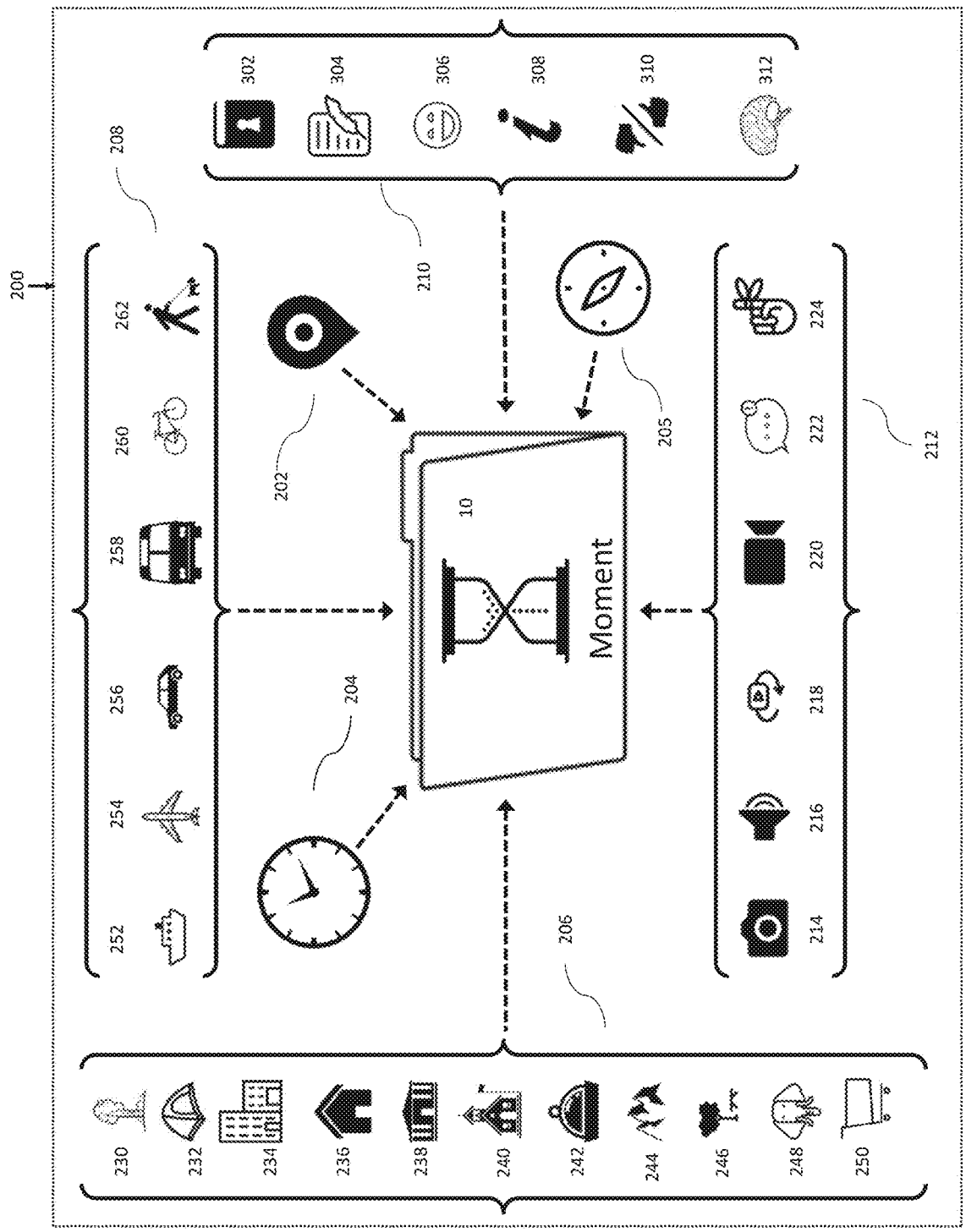
FIG. 2 is an environmental diagram illustrating an embodiment of a recording apparatus of the present invention.
Figure 18:
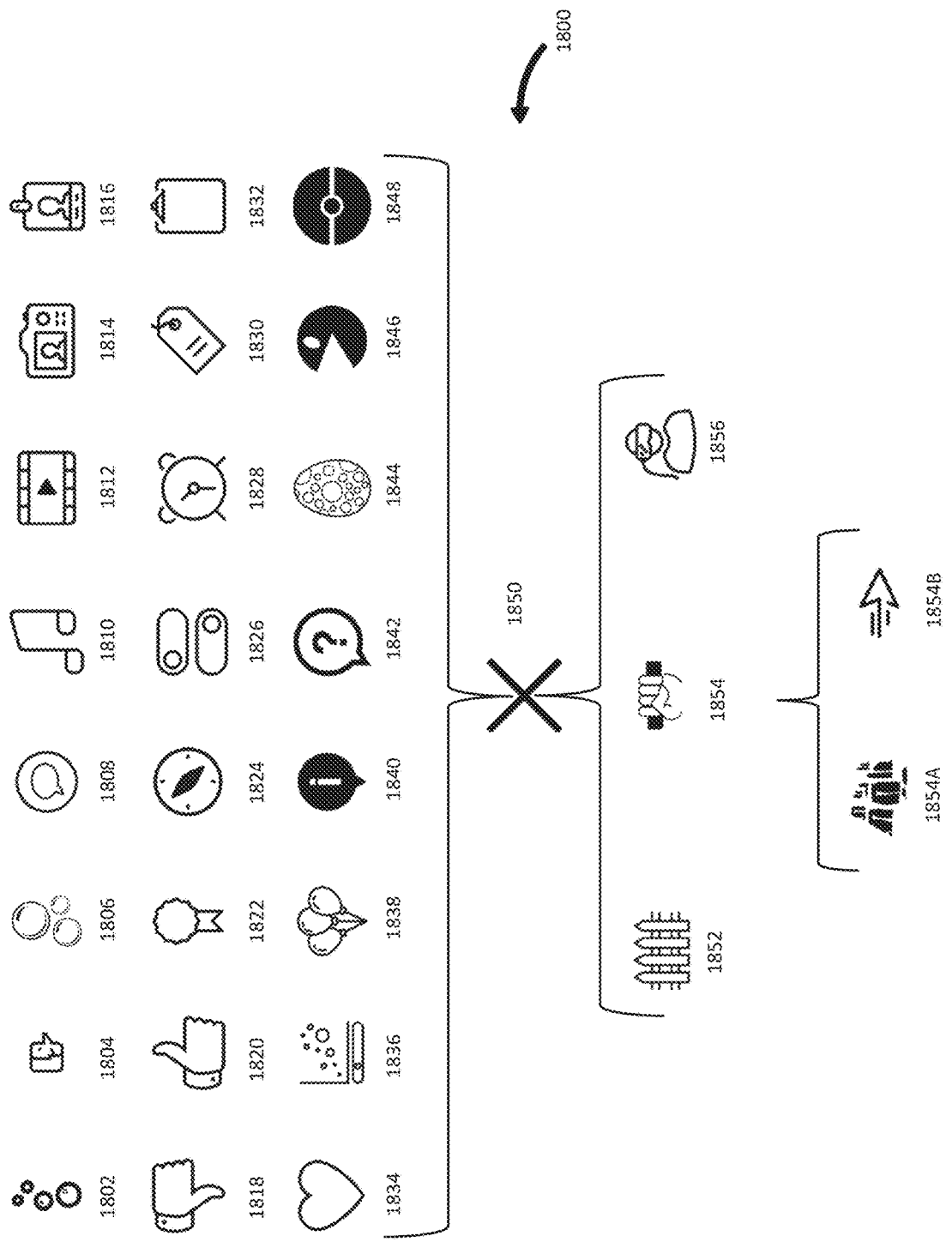
FIG. 18 is a highly diagrammatic illustration of a multi-dimensional moment file reader/recorder system capable of operation in both real, virtual, and augmented states where moment files may be categorized, accessed, and appended to real, augmented, and virtual objects.

FIG. 2 illustrates an embodiment of the system 100 of a moment recording system and apparatus 200 of the present invention. When activated, the moment recorder 200 records a location 206, or a series of locations in seriatim, for a moment 10 (or a series of moments) in, for example, a geographic coordinate system geodetic datum (WGS 84 or the like). The moment recorder 200 also records the date and time 204 for each location 206, and the orientation 205 of the enrolled handy 104 that recorded the moment 10 in a moment file 102. Included in the moment file 102 are additional classes of information (206, 210, 212, & 208) for providing multiple-dimensional-information 200 tagged and associated with and about a moment 10 (FIG. 18). For example, where the moment 10 was recorded while traversing a location in some means of transportation (also called locomotive source) 208 such as a ship 252, airplane 254, automobile 256, public transportation 258, bicycle 260, or while ambulating 262, the method of transport is preferably associated with the moment 10. Likewise, where the moment takes place in an area 206, e.g., a national park 230, on a road 604 or sidewalk (trail 602), a campground 232, building 234, house 236, museum 238, school 240, restaurant 242, scenic area 244, city park 246, zoo 248, store 250, or the like, such information will be recorded 200 in the moment file 102.

The locomotive source 208 may be determined by the position and orientation identification system based on direction and velocity measurements. In some embodiments, the position and orientation identification system determines the locomotive source 208 based on location as well as direction and velocity measurements. A user 12 may alternatively record in the system a locomotive source 208.

The location of a moment may be determined by the system based on location (coordinate) measurements, a user may record in the system a location, or the system may utilize the position and orientation identification system to determine location.

In a preferred embodiment of the recorder 200, media may also be associated (tagged) to a moment 10. For example, a picture 214, a sound or audio recording 216, a 360° video 218 or video 220, a text 222 or an image, a screen shot, a calendar entry, reminder 224, or the like. Also preferably associated with the moment 10 is context 210, or mood, or the like 108. For example, an embodiment may also record as part of a moment 10 a diary entry 302, a history 304, a feeling or mood 306, information 308, an opinion 310, or poignant anecdotes 312 or the like.

In another embodiment, a moment 10 may include an expiration code, a game play instruction, a game play more, or a setup menu.

Figure 3:
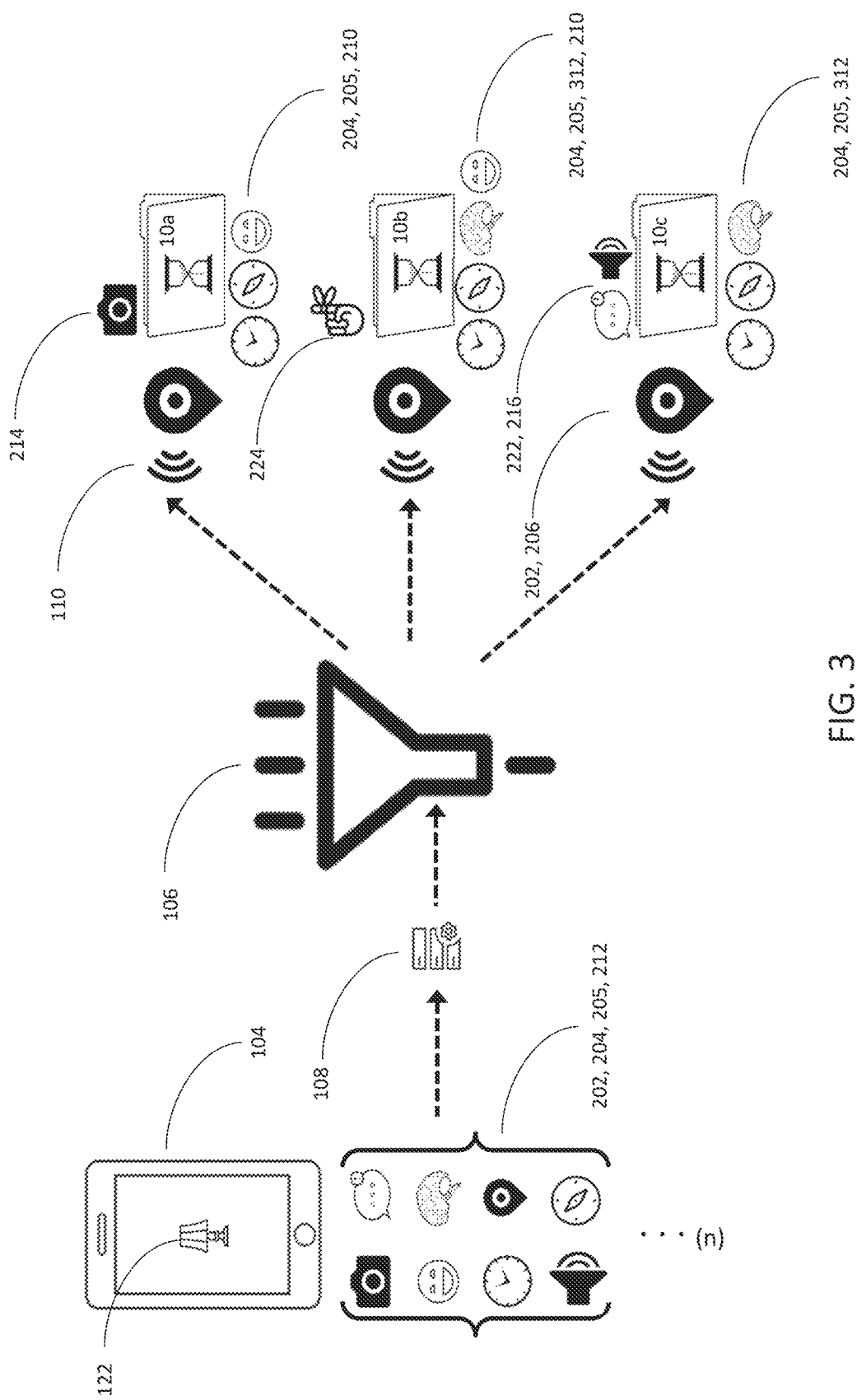
FIG. 3 is an environmental diagram illustrating an embodiment of a reader apparatus and associated presently preferred moment selection and filtration means of an embodiment of the present invention.

FIG. 3 illustrates a presently preferred method and apparatus for reading a tagged moment 10 (from a location 206 or the like). An enrolled handy 104 (camera) may be directed to, near, or toward an object 122 (e.g., a table lamp). A user 12 may then use the present invention 100 to tag the object and add content (206, 208, 210, 212) to be written with and associated with the object (and its location, time, and orientation of an enrolled handy) to a moment file 102. The moment file 102 is, in a presently preferred embodiment, written to a server 108, via a network connection 110 or the like (the file may be restricted to a particular user 12 or user group). The moment file 102 may be stored and searched by an in situ user (and in some embodiments also a remote user) location and at least one of a media 212, a locomotive source 208, a location 206, an orientation 205 of an enrolled handy, and a theme 210. Another user 12 with an enrolled handy 104 or the like may utilize a filter 106 or the like to restrict availability or reviewability of a moment file 102 in accordance with user selectable traits or preferences. Thus, a user 12 might select to have available moments 10 by location 206, enrolled handy orientation 205, and/or context. For example, a particular mood 306 or feeling 312, a type of object 122, a location 206, enrolled handy orientation 205, and/or media type 212. As a user 12 encounters an object the person may orient 205 their handy 104 at an object 122, at a location 206, at a set of coordinates to review available (readable) moments 10.

FIG. 3, by way of example, illustrates three moment files 10a, 10b, and 10c. Moment 10a contains a photograph and describes a mood 306 (and time 204, and enrolled handy orientation 205). Moment 10b contains a reminder 224, a time 204, an enrolled handy orientation, a feeling 312, and a mood. Moment 10c contains a text 222 (description), a sound recording (song) 216, a time 204, an enrolled handy orientation 205, and a feeling 312. All of the example moments (10a-c) may be associated with a single object 122 (lamp) at a particular location (e.g., a hotel lobby or the like), with an enrolled handy 104 oriented 205 in a similar direction, each created by different users 12, at different times 204, and readable 300 by one or more users 12.

A server 108 may contain an individual server, a universal server, a group server, and/or multiple servers providing connectivity to users 12 recording 200 and reading 300 via a network connection 110. The system 100 may provide users 12 access via a network connection 110 connected to a server 108 via a filter 106 (user selectable and controllable via, for e.g., an application driven menu or the like) associated with a reader 300 (enrolled handy 104).

Figure 4:
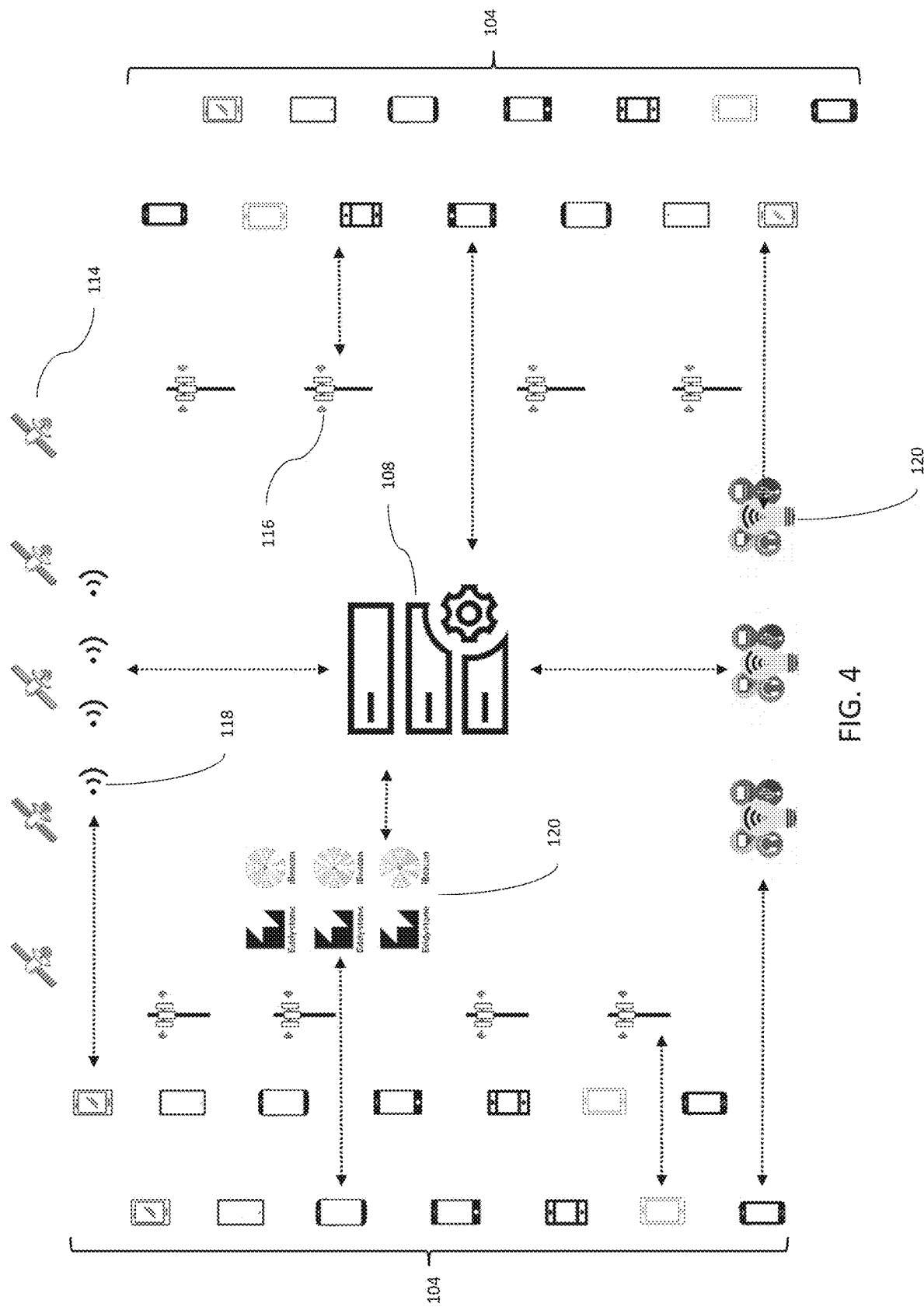
FIG. 4 is a highly schematic diagram of a location determination module (positioning sensors) of an embodiment of the present invention.

FIG. 4 illustrates a presently preferred network connection 110 schema for allowing recorders 200 and readers 300 of the system 100 to operatively connect with the system to record 200 and read 300 moment files 102. Preferably the system 100 may be utilized both in and out of doors. By way of illustration a plurality of handys 104 may be connected to a server 108 via a cellular network 116 (when available) and have consistent and reliable location information 114 via a GNSS system or the like. When a cellular connection 116 is unavailable, WiFi or Bluetooth 118 may be utilized to provide both connectivity 110 and user 12 location information 114 (triangulation, multilateration, or the like). LiFi 120 and other indoor location and connectivity systems may also be utilized (Eddystone, iBeacon) to provide robust system 100 connectivity 110 for both recording 200 and reading 300.

Figure 5:
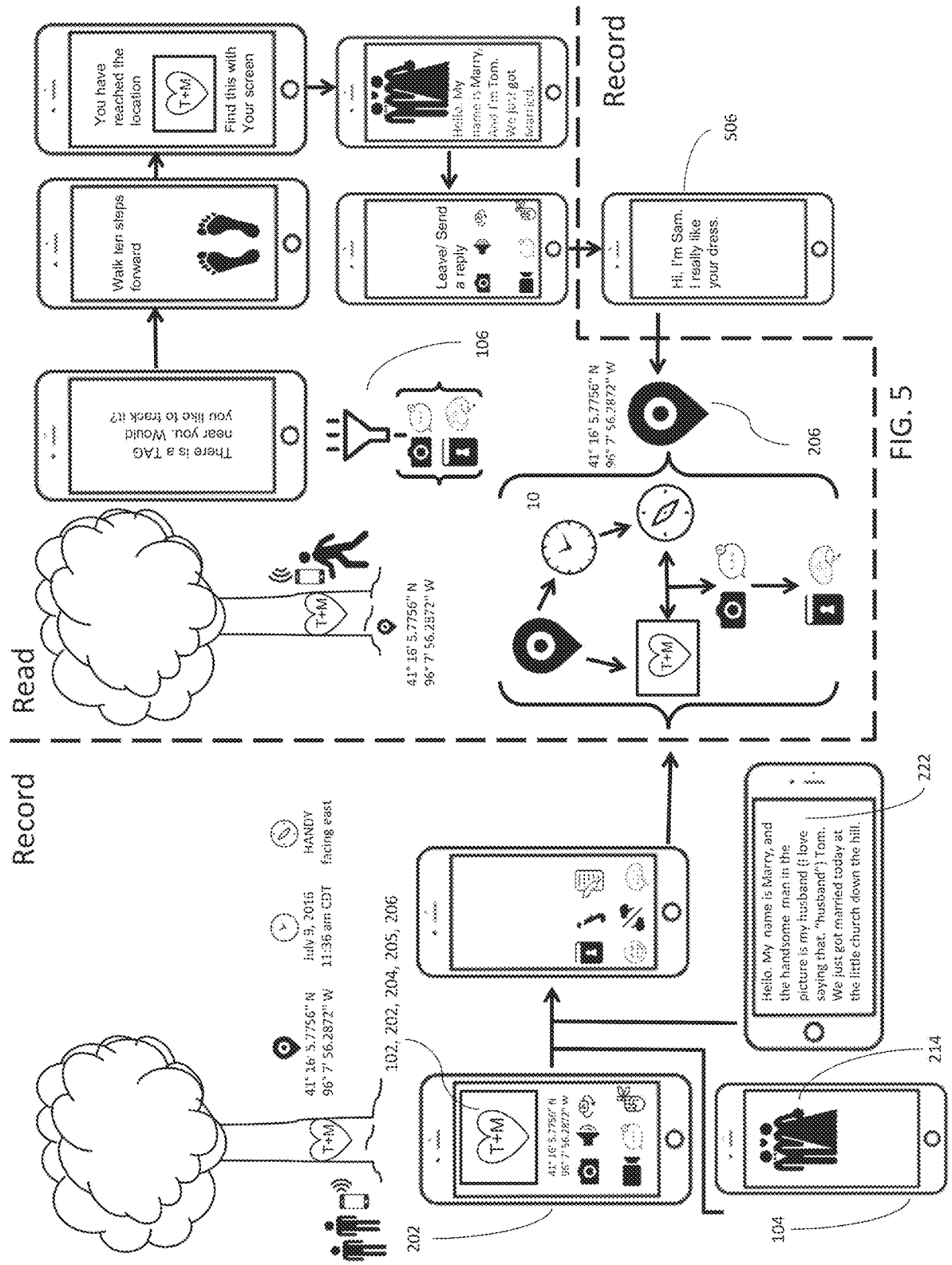
FIG. 5 is an environmental diagram of an embodiment of an example of a moment location tagging aspect of an embodiment of the present invention.

FIG. 5 illustrates a presently preferred means of utilizing an embodiment of the present invention. Users 12 may record 200 a heart and initials virtually or actually carved into a tree. The object (carving) may then be associated with their initials (and other media) virtually into a tree. Users 12 may decide to capture the moment using aspects of the present invention 100. Using handys 104, a user 12 may tag a particular location (longitude and latitude) of the tree, a reference object (i.e., heart carving), orientation 205 of an enrolled handy recording the moment, and a time 204 of the tag. Users may then select to leave a picture 214 and a text 222 in the moment file 102 attached with the paired location-object (tree-heart). Selecting a message type may also be provided, e.g., a feeling 312 and/or diary 302. After the passing of time another user 12 in the vicinity of the tagged location (tree) with appropriate filter settings (appropriately selected filter preferences or viewing authorization) may be alerted of a nearby moment 10. The moment 10 may be investigated or ignored. If the moment 10 is to be read, shared, an embodiment may tell a user 12 how many of their steps (and in what direction) the recorded moment 10 resides. Upon following a set of instructions and properly orienting 205 an enrolled handy 104 toward a tagged object a moment 10 may be read 300. This and subsequent users 12 may comment on the original and subsequent moment with a new moment 506. A different media may be utilized, and a reply may be sent to the original recording enrolled handy 104. It is noted that an enrolled handy 104 must be proximate the location 202 of a recorded moment 10 and oriented 205 toward the location 202 of the recorded moment 10 in order to read 300 the moment file 102.

Figure 6:
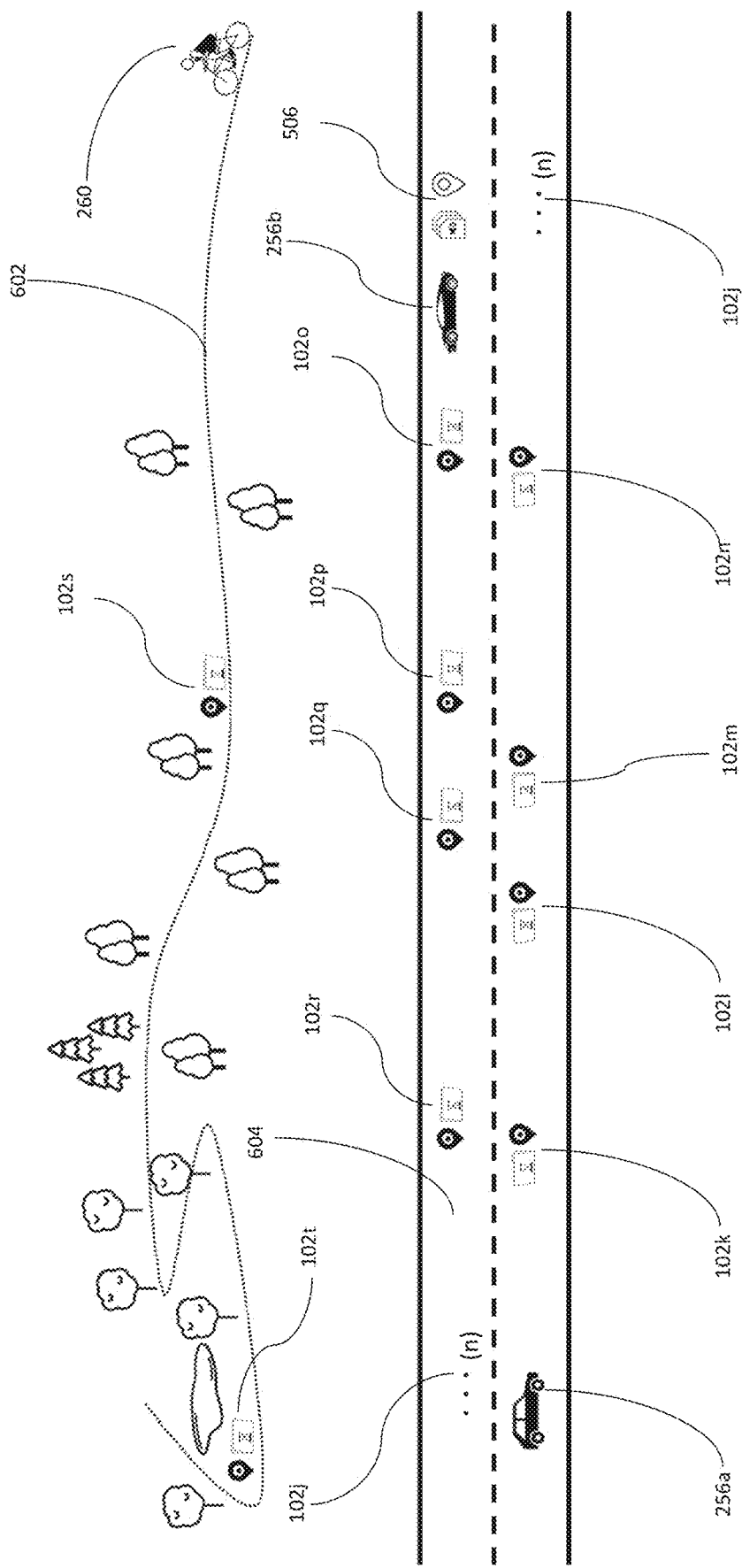
FIG. 6 is an environmental diagram illustrating an embodiment of a locomotion-based embodiment of an aspect of the present invention.

FIG. 6 illustrates an embodiment of the system 100 for utilization while moving 208. In operation a user 12 may leave a string of moments 102k-102t along a travel way 602, 604. It is noted that a user may leave a string of any number of moments 102j. A user 12 in a vehicle (or walking 262) may both record and read moment files 102 along the path. For example, a plurality of photographs 214 (album covers) and songs 216 might be left as a playlist for reading (watching/listening) by a user traveling (in a vehicle 256, bicycle 260 or the like). Member users 12 and the like may subscribe to a single or various recorders 102*j* for listening and viewing the travels and travel interests of a person (recorder) they follow via their filter 106 (blogger/disk jockey). Likewise a plurality of photographs 214 or video snippets may be left showing scenic areas along a route during different seasons or conditions. Additionally, a recorder may record commentary or opinions as in a travelogue or the like. Member users following a particular author (travel writer/blogger) may obtain a more complete and fulfilling travel experience. Furthermore, children and the like may experience the commentary of past travel (e.g., a travelogue) recorded moments 10 of a parent (family member or friend) along a particular route. Moment archeologist of the system 100 may track, write histories, study, promote policies, predict future interest, and the like.

Figure 7:
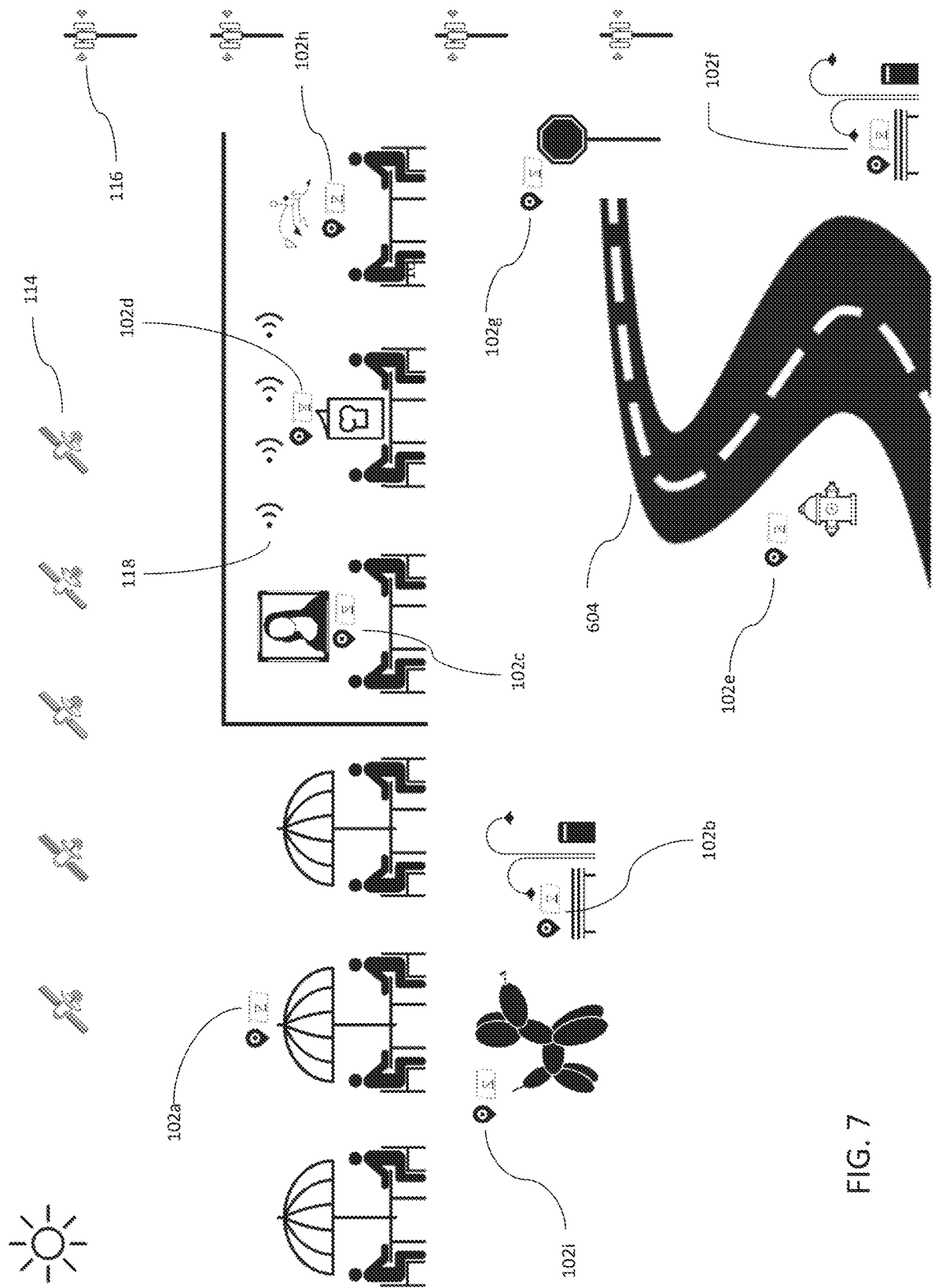
FIG. 7 is an environmental diagram of various aspects of an exterior and interior utilization of an embodiment of the present invention.

Turning now to FIG. 7, a moment 102*a* may be recorded at an outdoor table at a restaurant or café memorializing a moment via a particular medium or collection of media such that another user 12 may experience or enjoy a particular aspect saved 200 by another user 12. In an indoor table a user 12 might read 200 (or record 300) a moment 10 regarding an object such as a painting 102*c*. The user's 12 enrolled handy 104 (or the like) may provide location 202, orientation 205 and connectivity via a wireless network 118. Additionally, a user 12 may opine 310 regarding a menu item 102*d* or menu, or meal, or the like. Information 308 regarding a particular locus in quo may also be shared via an embodiment of the system 100 of the present invention. Some locations including interesting objects, such as a sculpture, thing, or the like 102*h*, which may warrant a comment or moment 10 of interest to other users 12. Outdoor venues may also include objects to be tagged with a moment 10 such as an outdoor sculpture 102*i*, bench 102*b*, hydrant 102*e*, bus stop 102*f*, sign 102*g*, or the like. Location data may be derived via a GNSS network 114 or wireless network 118, or the like.

Figure 8:
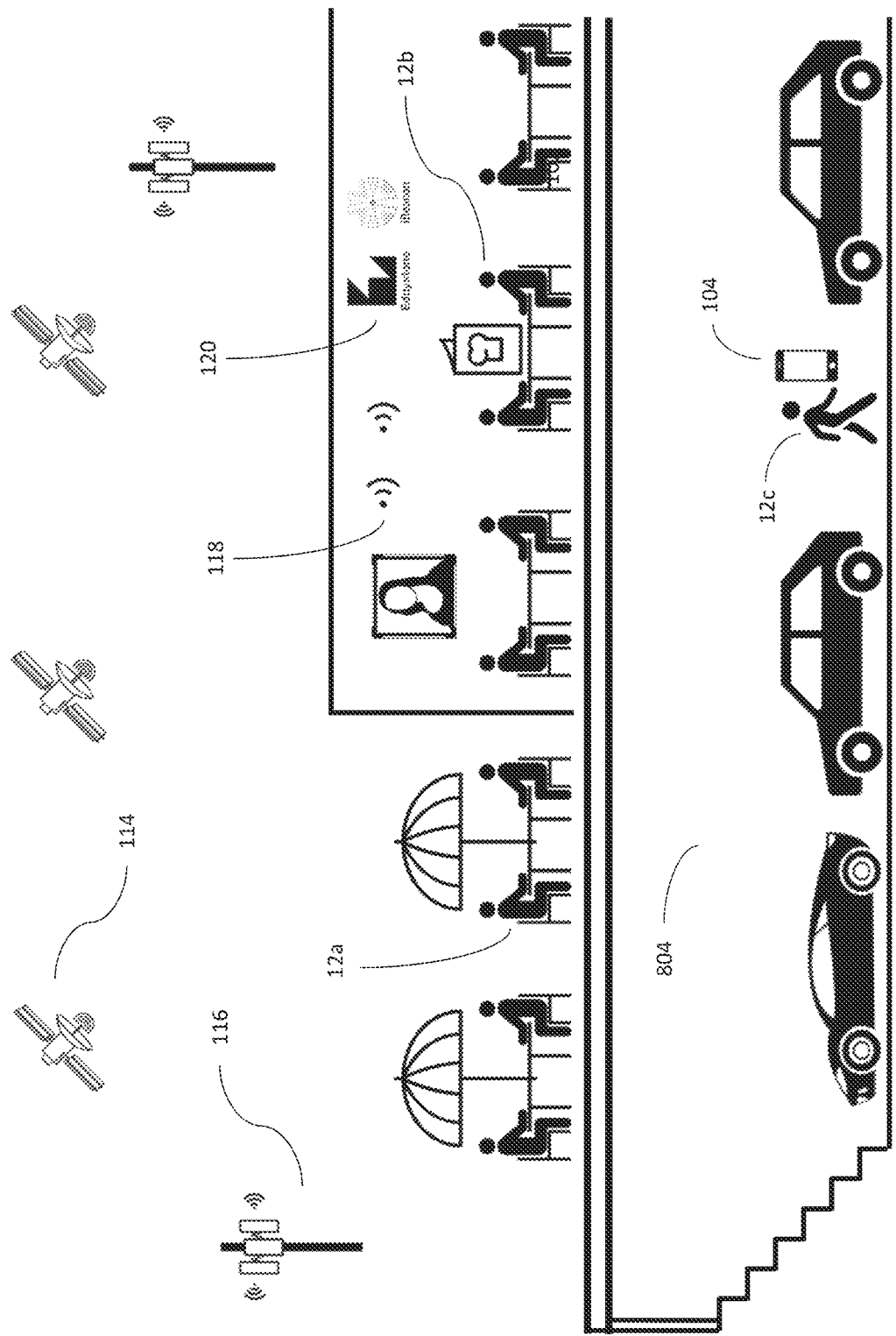
FIG. 8 is an environmental diagram of various aspects of obtaining location information of an embodiment of the present invention.

FIG. 8 illustrates, by example, the utilization of an embodiment of the present invention 100 in various places where different methods of obtaining location information 114 may be employed. Location information 114 may be obtained from a cellular network 116 via a GNSS system, a WiFi or Bluetooth 118 connection, a LiFi 120 connection, or an enrolled handy 104 position and orientation identification system. For example, a user 12*a* located in an outdoor venue may obtain from a cellular network 116 location information 114 via a GNSS system or the like. By way of another example, a user 12*b* located in a building may obtain location information 114 from a WiFi or Bluetooth 118 connection or a LiFi 120 connection. It is noted that a user 12*b* may not have a cellular network 116 signal within a building or the signal may be diminished and a WiFi or Bluetooth connection is the only communication method of obtaining location information 114.

It is noted that in various situations not all methods of obtaining location information 114 will be available to a user 12. In some situations the strength of an externally transmitted positioning signal may be diminished, intermittent or absent in a particular location where a user is located with an enrolled handy 104. For example, a global navigation satellite system (GNSS) such as the global positioning system (GPS) may provide a diminished signal to an enrolled handy 104 of a user 12*c* located in an underground parking garage 804 and thereby prevent the enrolled handy 104 from receiving location information 114. In situations where location information 114 can not be obtained by an enrolled handy 104 via an externally transmitted positioning signal or internal spatial position and orientation identification system operating on an enrolled handy 104 may provide location information 114. For example, in the absence of an externally transmitted signal for positioning an enrolled handy 104 may determine its location 206 and orientation 205 utilizing one or more measurements of the instruments contained in an IMU of the enrolled handy 104 and a point of origin. It is further noted that in some situations the only method of obtaining location information 114 may be by way of a position and orientation identification system operating on an enrolled handy 104 of the user.

Figure 9:
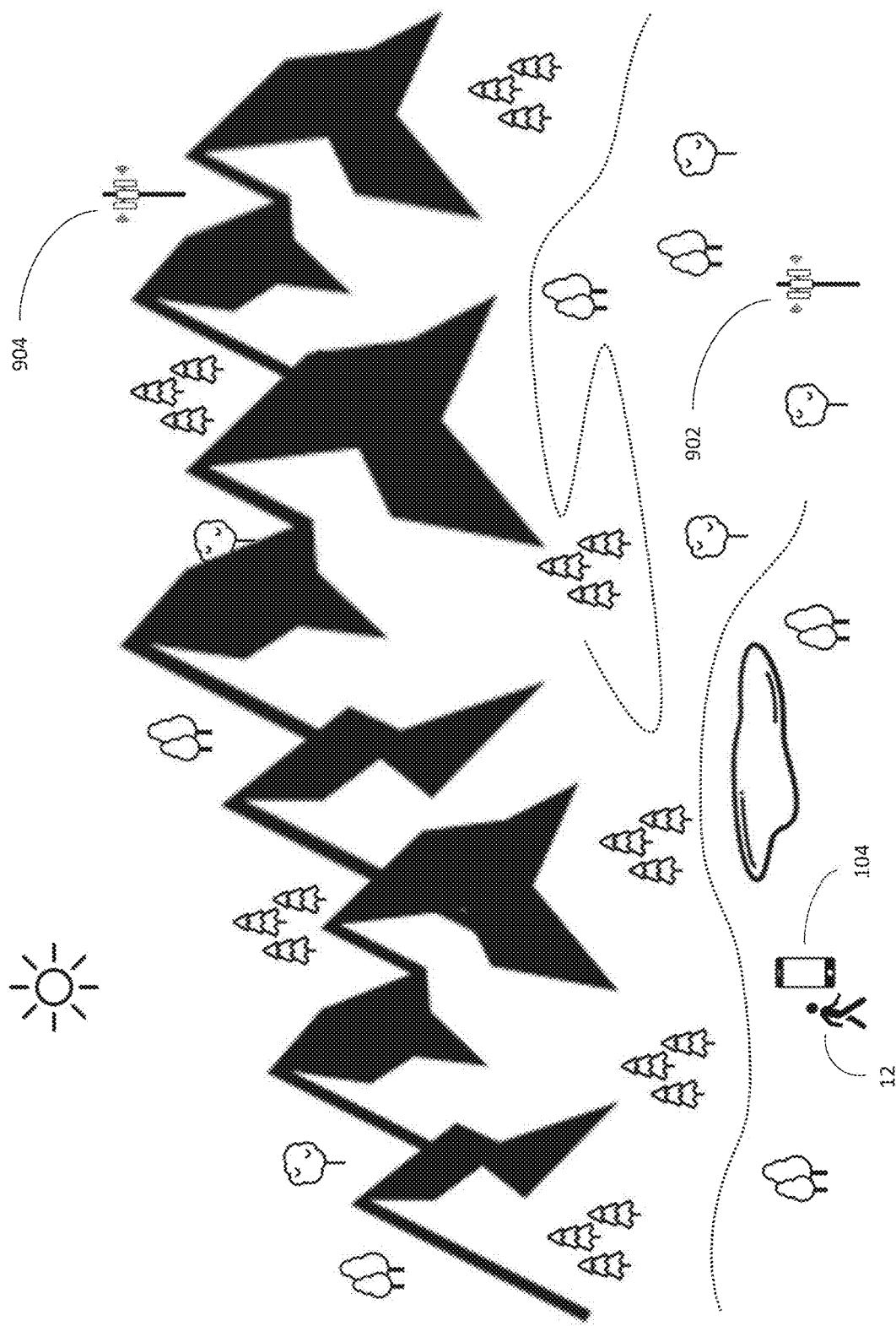
FIG. 9 is an environmental diagram of various aspects of determining location of an embodiment of the present invention.

FIG. 9 illustrates, by example, the utilization of an embodiment of the present invention 100 where a position and orientation identification system operating on an enrolled handy 104 is used to determine location. For example, an enrolled handy 104 operated by a user 12 in a remote location may be unable to perform multilateration of radio signals from two towers if only one tower 902 is in proximity of the enrolled handy 104 or if the radio signals received from two cellular network towers 902, 904 are too weak.

By way of another example, when traveling in a subway an externally transmitted positioning signal may be intermittent and connection may be made and lost a number of times during the course of travel.

In situations where an externally transmitted positioning signal is diminished, intermittent, or absent the system may utilize instruments integrated into the enrolled handy 104 to determine location. For example, the system may calculate the location of the user utilizing measurements from a magnetometer, an accelerometer, a gyro sensor, or a gyroscope. An orientation of an enrolled handy 104 may be determined by a magnetometer. A direction of movement by a user 12 may be determined by an accelerometer. A change in a direction of movement of a user 12 may be determined by a gyro sensor or gyroscope. Based on a particular situation a magnetometer, an accelerometer and a gyro sensor or gyroscope may function independently or collaboratively to determine a location and orientation of a user 12 that is experiencing a disruption in or absence of an externally transmitted positioning signal. The position and orientation identification system may determine a location that includes a longitude, a latitude and an elevation; as well as an orientation of the enrolled handy 104 that includes a pitch, a yaw, and a roll.

In the absence of an externally transmitted signal for positioning an enrolled handy 104 may determine its location 206 and orientation 205 utilizing one or more measurements of the instruments contained in an IMU of the enrolled handy 104 and at least one of a point of origin, a destination or a waypoint along a journey. For example, in the absence of an externally transmitted signal for positioning an enrolled handy 104 may determine a course traveled and orientation 205 utilizing one or more measurements of the instruments contained in an IMU of the enrolled handy 104 once travel is complete and a destination is recorded by a user 12. At times an externally transmitted signal for positioning may be present when travel begins and therefore the point of origin is known by the system. In other situations a user 12 records a point of origin in the system before travel begins. In these situations the system will track the location and orientation of the enrolled handy 104 during travel by recording the change in location and orientation of the enrolled handy 104 during the course of travel.

When an intermittent externally transmitted positioning signal is present an enrolled handy 104 may utilize one or more measurements of the instruments contained in an IMU of the enrolled handy 104 to determine a location 206 and an orientation 205 of the enrolled handy 104 utilizing the last known location of the enrolled handy 104 as a point of origin. For example, in situations where an intermittent externally transmitted position signal exists the position and orientation identification system may treat each loss of signal as an absence of an externally transmitted position signal and begin tracking location 206 and orientation 205 of the enrolled handy 104 until the externally transmitted positioning signal is acquired again and a location 206 and an orientation 205 of the enrolled handy 104 may be verified by location information 114.

In some circumstances a user 12 may record in the system a locomotive source, a point of origin, or a destination. In a situation where an externally transmitted positioning signal is diminished, intermittent or lost the system may determine the progress of a journey and thereby a location of a user 12 until the externally transmitted positioning signal is again received if a point of origin and destination have been recorded in the system. In this way moments may be recorded while a user 12 travels and has a disruption in an externally transmitted positioning signal. Additionally by determining the location of a user 12 while the user is traveling a moment 10 may be viewed when the user becomes proximate to and oriented toward the location of a recorded moment 10.

Figure 10:
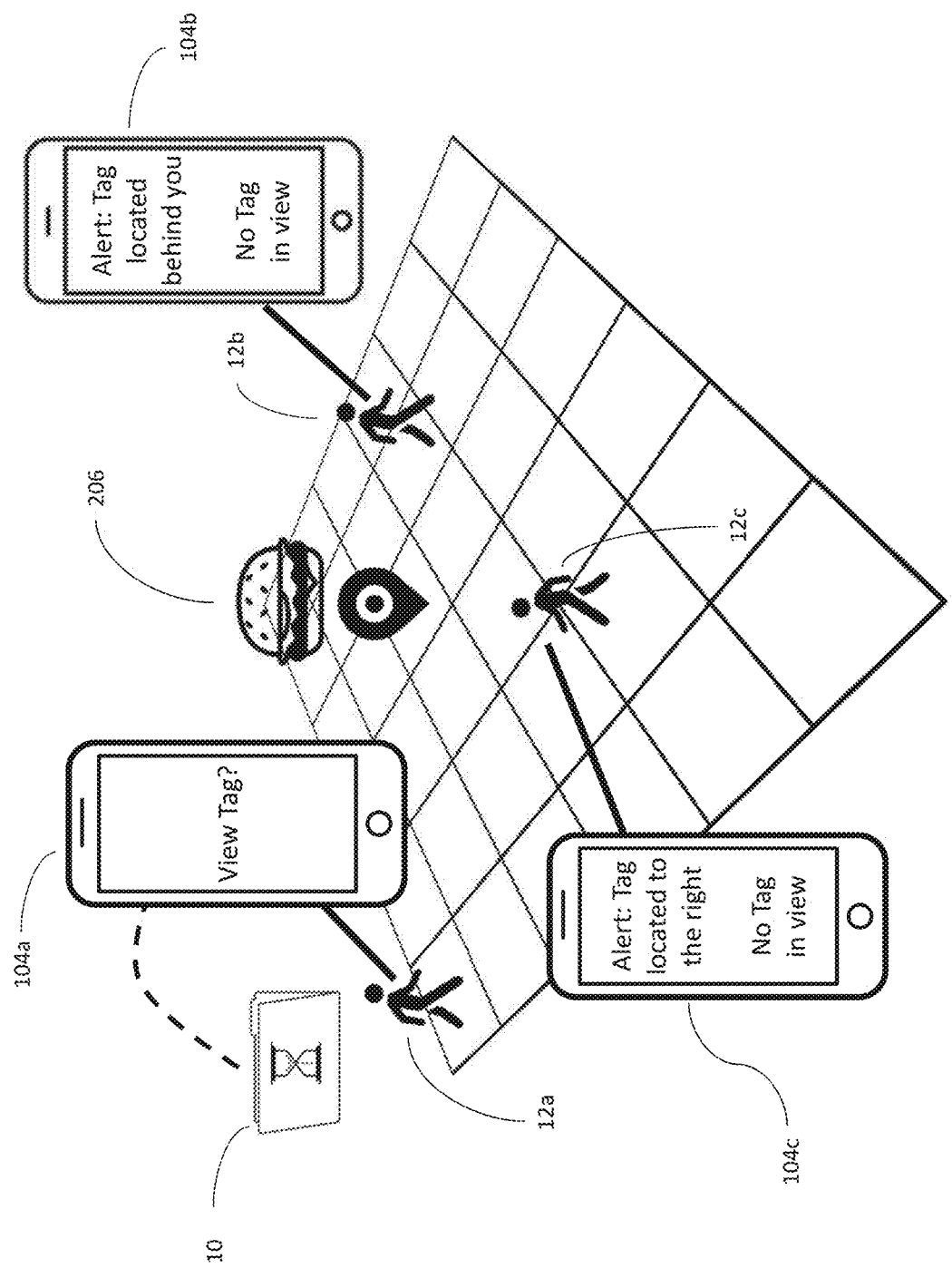
FIG. 10 is an environmental diagram illustrating the utilization of location and orientation to identify and locate a moment of an embodiment of the present invention.

FIG. 10 illustrates, by example, an embodiment of the system 100 utilizing location and orientation of an enrolled handy 104 to identify and locate viewable moments 10. For example, a moment 10 tagged to a location 206 may be viewable if an enrolled handy 104 is both proximate and oriented 205 toward a tagged location. For instance, a user 12a proximate and facing a location 206 tagged with a moment 10 may be alerted by an enrolled handy 104a of the existence of a viewable moment 10. It is noted that the user 12a is alerted of the existence of a moment 10 that has been tagged to a location 206 because the user 12 has an enrolled handy 104a proximate the location 206. It is further noted that a tagged moment 10 is viewable only once an enrolled handy 104a is both proximate and oriented 205 toward the location 206 of the tagged moment 10. A user 12b that is proximate a tagged location 206 and has an enrolled handy 104b oriented 205 away from a location 206 may be alerted of a tagged moment 10 nearby. A user 12b may choose to follow instructions to locate the moment 10 or ignore the alert. Once an enrolled handy 104b is oriented 205 toward the location 206 the moment 10 is viewable and may be read 300. Likewise a user 12c that is passing by and proximate a tagged location 206 may be alerted by an enrolled handy 104c of a nearby tagged moment 10. A user 12c may choose to follow instructions to locate the moment 10 or ignore the alert. Once the enrolled handy 104c is proximate and oriented 205 toward the location 206 the tagged moment 10 is viewable and may be read 300.

Figure 11:
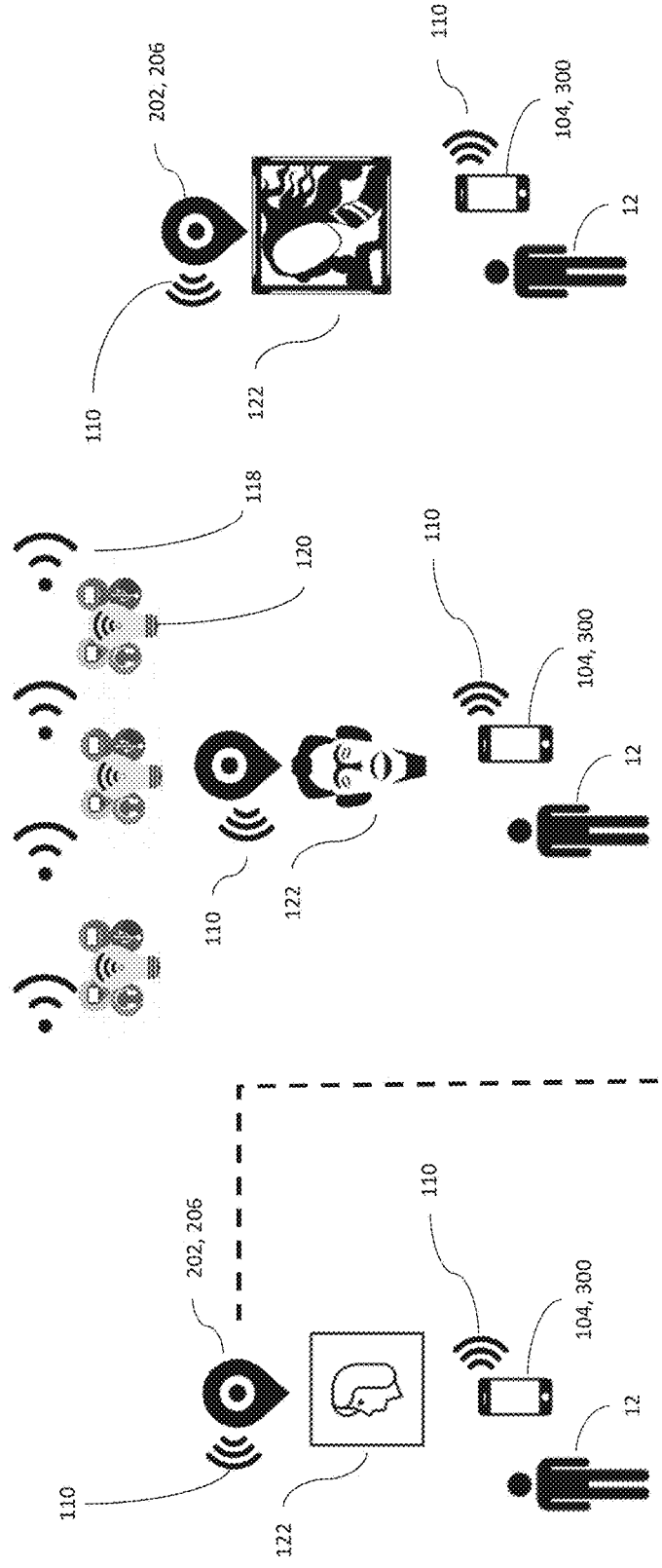
Figure 11:
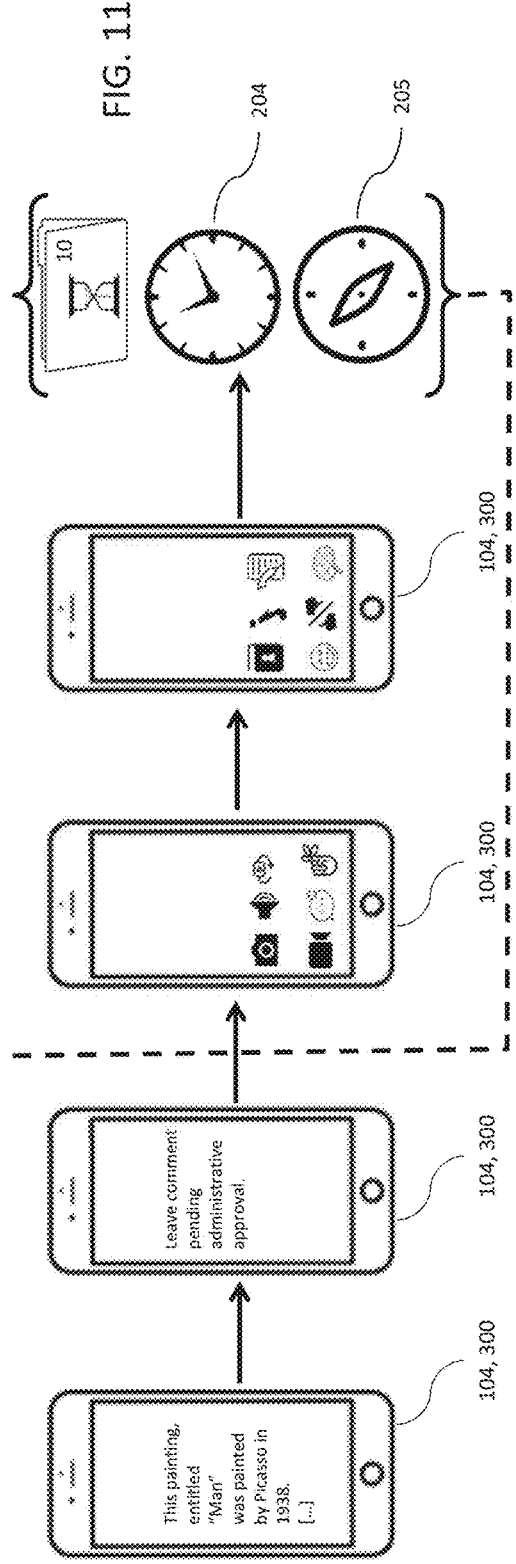

FIG. 11 illustrates, by example, the utilization of an embodiment of the present invention 100 in a museum. Users 12 may leave tagged moments 10 associated with art objects 122 containing editorial, opinion, and informational media or the like. WIKIPEDIA® like articles, encyclopedia entries, and the like may be appended to or be part of a moment 10. Likewise, content created by the system 100 may blend moment 10 content to form moment file 102 abstracts of a particular location or thing of interest. Additionally, a professional, such as a curator may leave moments 10 near objects 122. These professional comments (moments 10) may be commented on by other users 12 and shared within a small group or the like. In a preferred embodiment an administrator may first approve or reject moments 10 left within a geo-fenced area (around an object, within a facility) or the like. In this fashion, an authority may control the type of moment's readable/recordable. Likewise, paid moments 10 may be left on or about a facility tied to a particular activity 208 or object 122. Other monetization schema may also be employed, e.g., a subscription to the recordings of a particular recorder 12. A filter for filtering all commercial moments 10 may also be available for a subscription requiring a set number of recorded moments 10 over a particular period of time (or a small pecuniary fee). Subscription revenue (in at least one embodiment) may be wholly or partially distributed to an appropriate holder 1306 in the form of reduced fees or the like. Highly desirable moment content 10 may be associated with a brief, a paid announcement, or the like.

Figure 12:
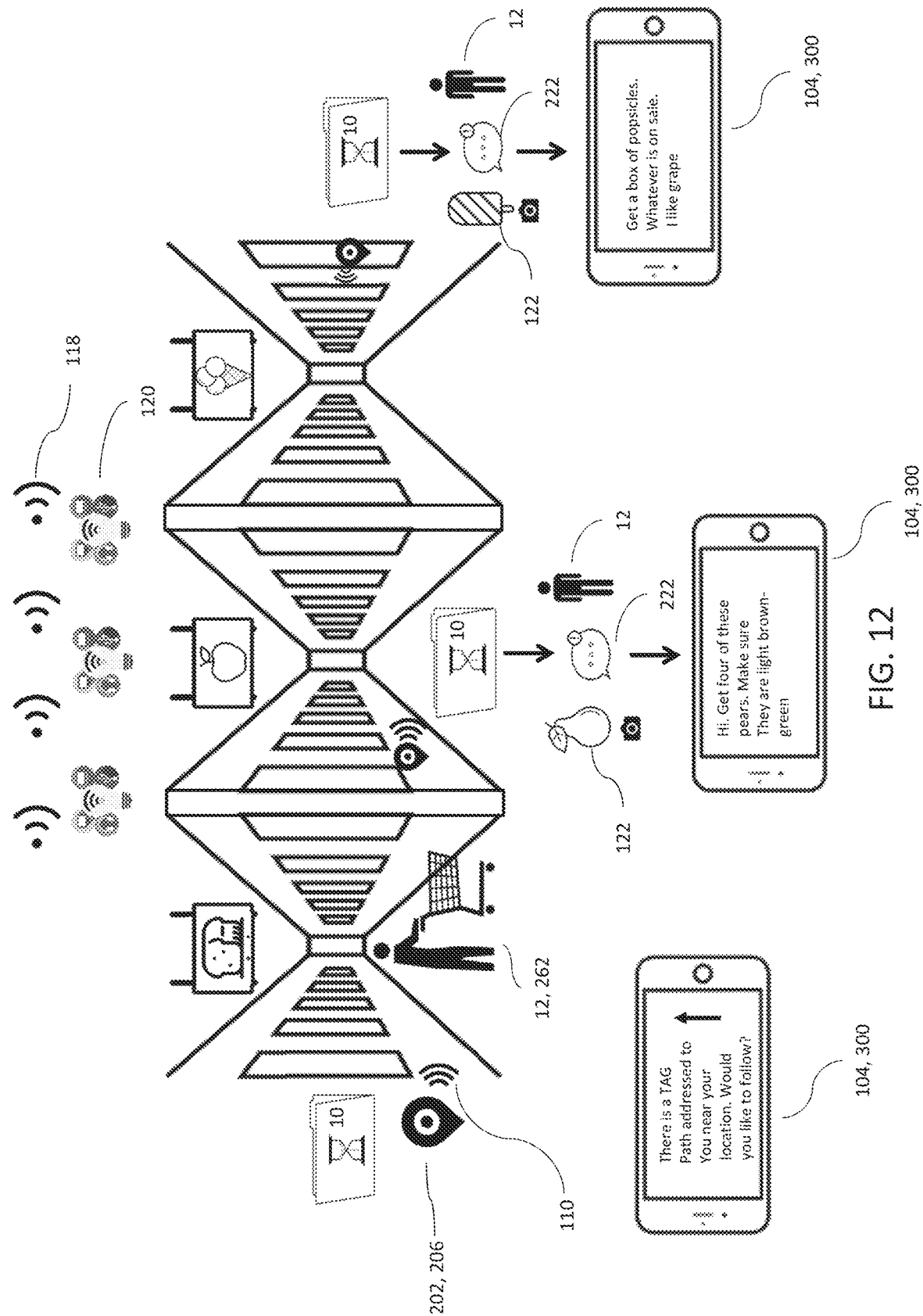

FIG. 12 illustrates an embodiment 100 of the invention in a retail environment. A user 12 might leave a plurality or moments 10 near and associated with grocery items and the like. A user desiring to make a particular recipe or the like might follow a plurality of moments 10 within a grocery store or the like to purchase the correct or desired items. A virtual shopping list may be created containing other suggested items necessary to fabricate a particular dish or the like. A significant other might leave shopping instructions 1202 for their partner. Likewise, coupons and discount related information might be interactively obtained by users 12 through moment files 102 of an embodiment of the invention 100. This provides vendors, product placement managers, marketing/advertising professionals, manufacturers, and storeowners to require proximity both in space and/or time to obtain a desirable moment 10. For example, at 8:00 AM a store might be otherwise in need of shoppers on any given day. In order to drive traffic into a store (venue) a scavenger hunt (breadcrumbs, spoor) contest or the like might be utilized to provide discounts or prize type interests for shoppers.

Figure 13:
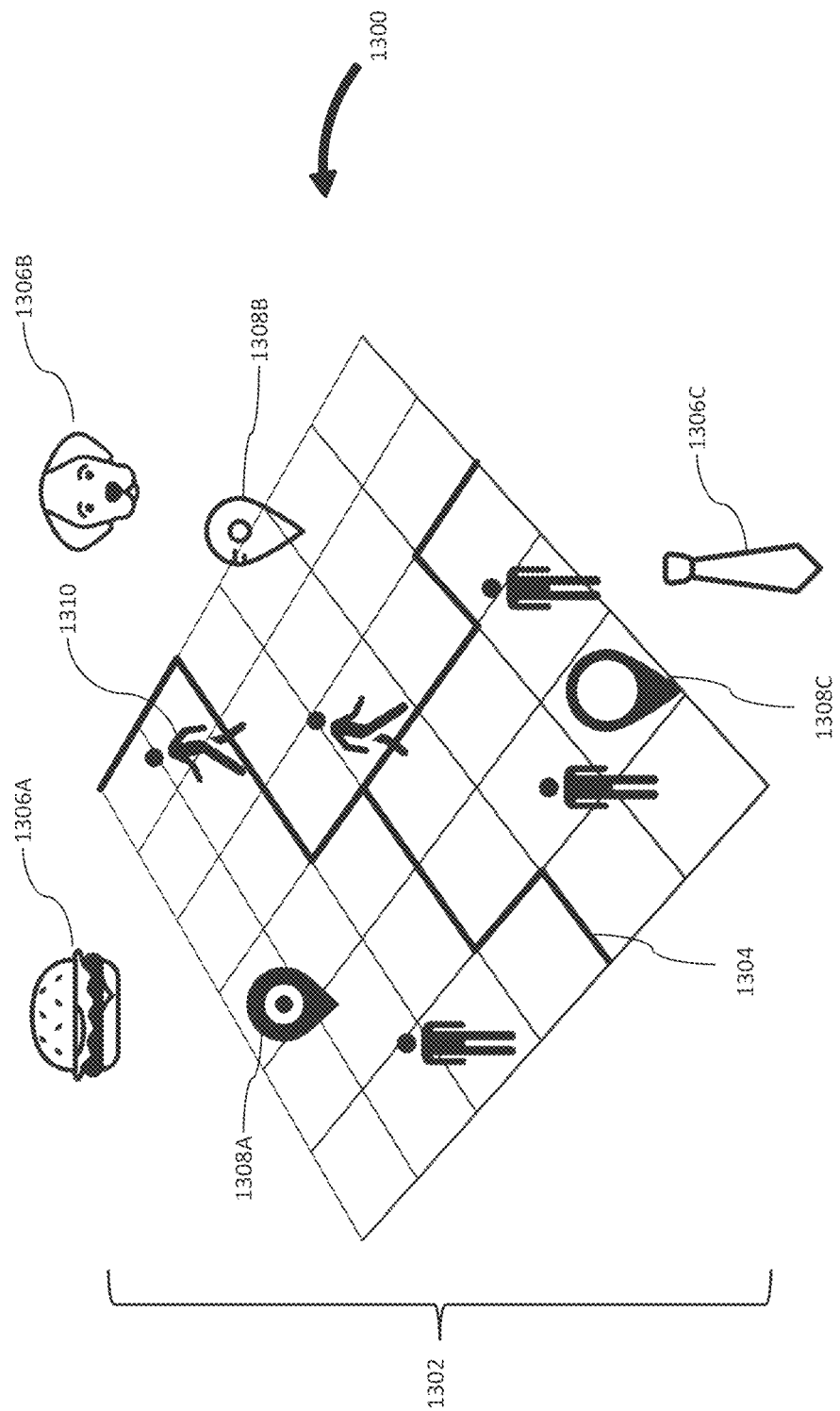
FIG. 13 is a highly schematic representation of an augmented property ownership (control) system for providing a rule of law based augmented property environment.

FIG. 13 illustrates an augmented property map 1302 based upon real property boundaries or virtual boundaries 1304 in accordance with at least one embodiment of the present invention 100. Users 12 may identify, price, bid on, purchase, negotiate, trade, rent/lease, borrow, and the like a parcel of augmented property 1300. Additionally, an owner/holder 1306 of a parcel of augmented property 1300 may restrict use and or prevent trespassing users 12 and their associated moment files 10. Moments 10 may only, for example, be left, accessed/enjoyed, and/or seen (visualized by a particular user 12) as provided by the system 100 (in at least one embodiment 100).

In one embodiment users 12 gaining access to a particular location 202 by being physically present in the location may receive some haptic response (ping) originating from the system 100 to a user's 12 enrolled handy 104, or from a holder 1306 interested in separately interacting with a particular user 12 reading/recording 300/200 a moment file. A virtual property ownership system 1300 may include an augmented (virtual) map 1302 augmenting real or contrived boundaries 1304 such that an owner 1306 of augmented property may monetize system 100, users 12, moment file 10 recording/reading 200/300. Augmented property holder 1306 (i.e., 1306A, 1306B, 1306C) identification may be designated with a holder 1306 moment file 1308 which must be accessed/played or the like in order for a user 12 to record or read a moment file 10. In one embodiment, a user moving 1310 across a boundary 1304 into another holders' 1306 augmented property may be (or may not be) required to access the crossed into holders augmented property moment identification moment file 1308. A user's 12 time within an augmented estate, and/or number of previously viewed user holder based content moment files 1308, may modify the content of a holders' moment file 1308 so as to present either full, abbreviated, or no moment file content to said user. In another embodiment, a moment file 10 within an augmented property may be monetized. For example, a pecuniary fee may be required to record 200 or read 300 a moment 10 within an augmented property.

Figure 14:
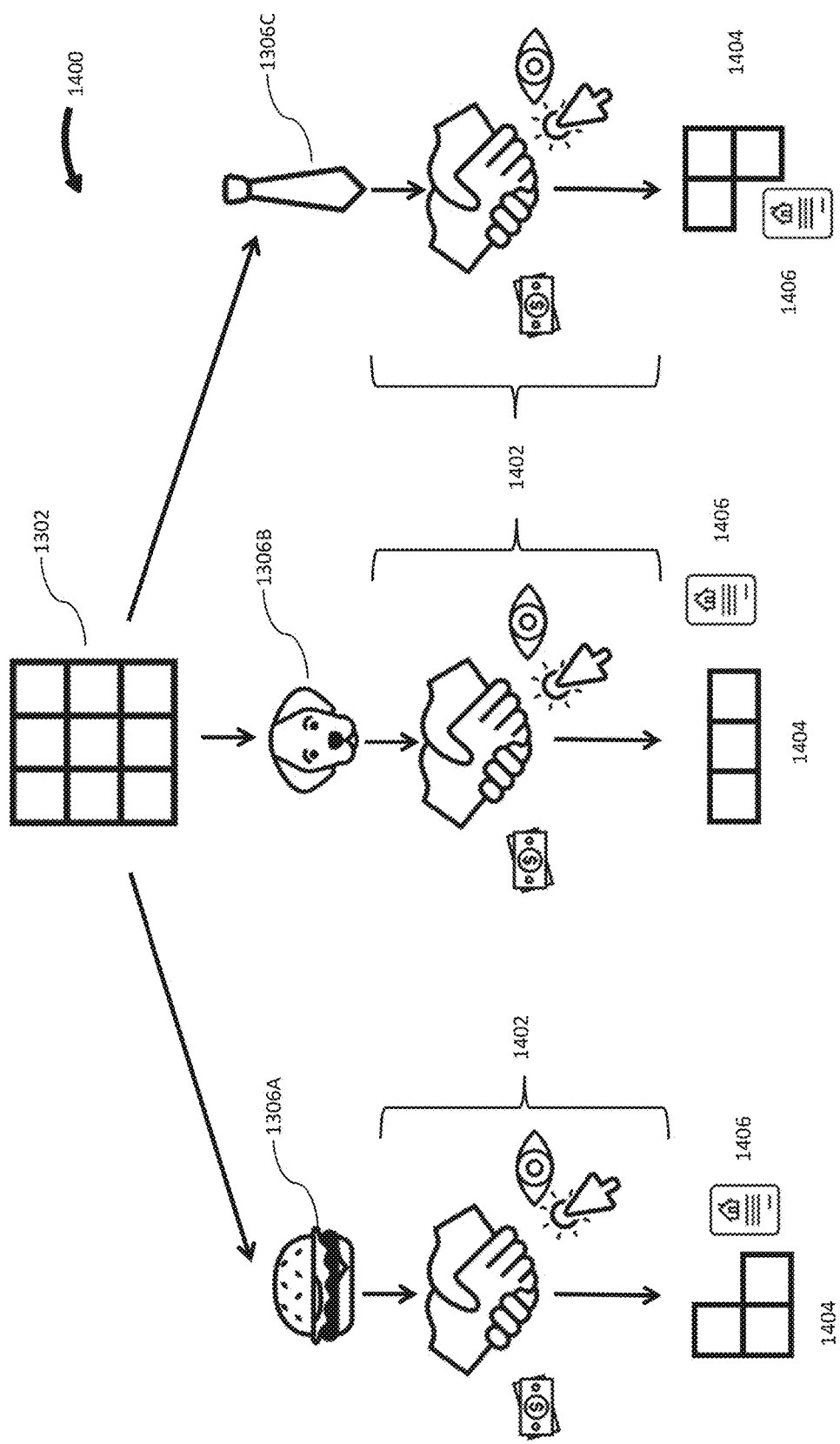
FIG. 14 is an augmented property purchasing flow diagram illustrating means for hypothecating, deeding, owning, obtaining, and divesting augmented property according to a rule of law based system.

FIG. 14 illustrates a currently preferred process for transferring augmented property in accordance with the system 100 of the present invention. The purchasing process 1400 includes an augmented property 1302 divisible temporally, by user population, by clicks, acreage (square meter), onerousness of holder moment 1308 content, by value and frequency of chits or coupons provided to users, coupon downloads, user traffic, and user feedback. Holder 1306 control over augmented property may be limited to actual real property ownership, fee simple, fee tail, temporal estate, lease, or license. An agreement 1402 may be utilized to describe terms and conditions incumbent on a purchasing holder's utilization of the augmented property 1404. Augmented property deeds 1406 may be freely or restrictedly hypothecated or traded in accordance with the agreement 1402.

Figure 15:
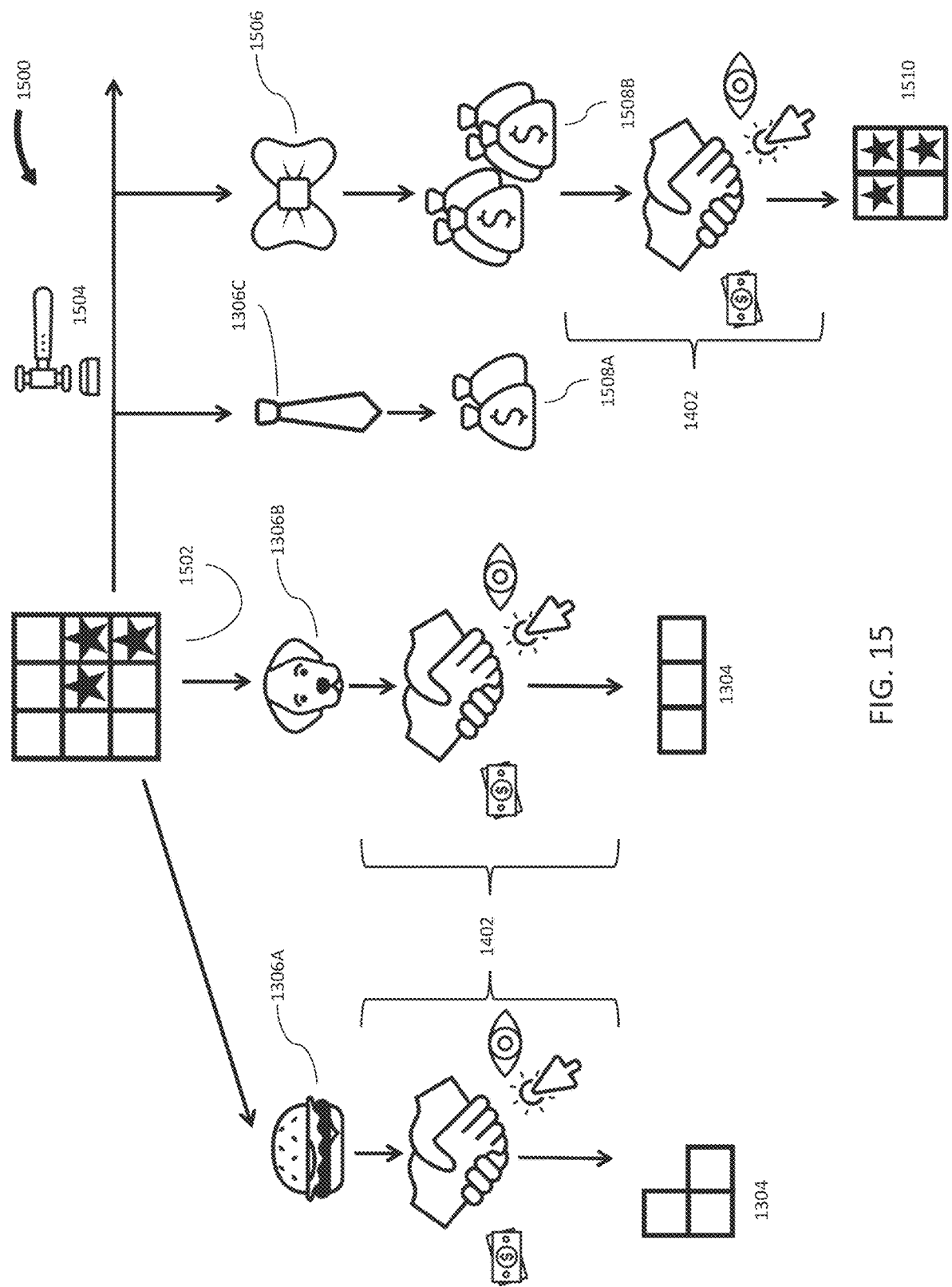
FIG. 15 is an augmented property auction flow diagram illustrating a means of monetizing an embodiment of the present disclosure.

Turning now to FIG. 15, an auctioning system 1500 for prized augmented property 1502 or a plot of augmented purchased property 1510 in an auction 1504 facilitated by the system 100 in accordance with auction standards (minimum bid, absolute, and reserve or the like). Competing bidders 1506 may combine interests, divide interests, and otherwise negotiate terms in accordance with the system 100 (auction system 1500 rules). Rules may be set forth in a system moment file 102 accessible to interested parties to the property 1502. Disputes may be decided via arbitration, a rating system, or the like. Funds 1508 may be distributed partially or fully to users providing moment file 102 content based upon user recorded moment 10 ratings, views or the like. The funds 1508 may also be distributed by the system 100 to users who access/read moment files 102 located in augmented property 1502 in the form of coupons or chits. These coupons or chits may be underwritten back to the holder 1306 by the system 100 in the form of reduced lease, rent, click, or property holder maintenance fees (or the like) payments to the system 100.

Figure 16:
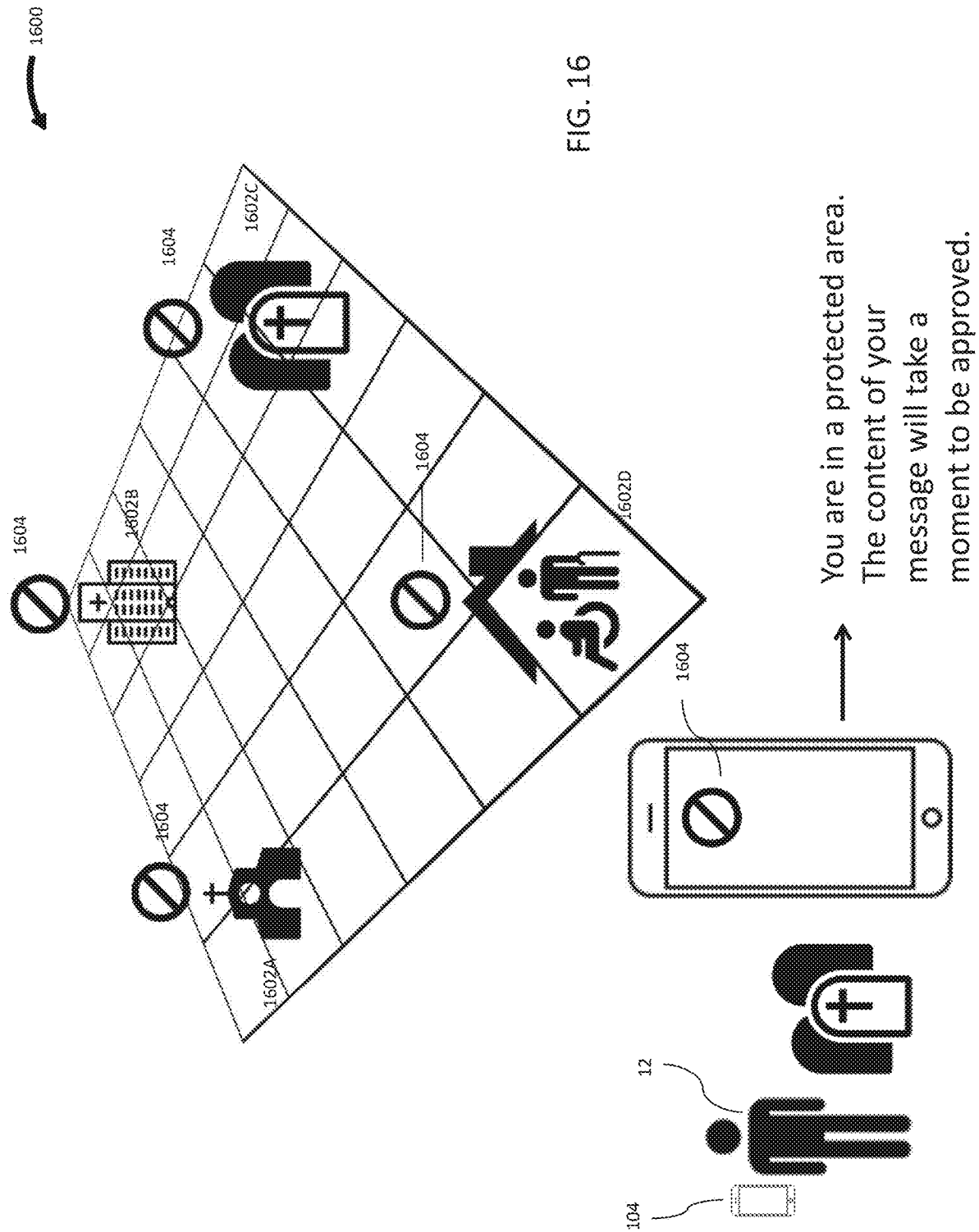
FIG. 16 is an environmental diagram of an augmented estate geo-fencing system of an embodiment of the present disclosure.

FIG. 16 illustrates a feature of an embodiment of the present invention restricting 1604 moment file 102 content recording or reading (viewing) within a augmented geofenced area 1602 (churches 1602a, temples 1602b, cemetery 1602c, nursing homes 1602d, schools, and the like). Holders 1306 may also purchase and then prevent all moment file 102 recording/reading 200/300 within the boundaries 1304 of their augmented property. Real property holders may seek condemnation (eviction) from the system 100 of an augmented property holder's 1306 interest, which is within the boundaries of the real property holder's estate.

Figure 17:
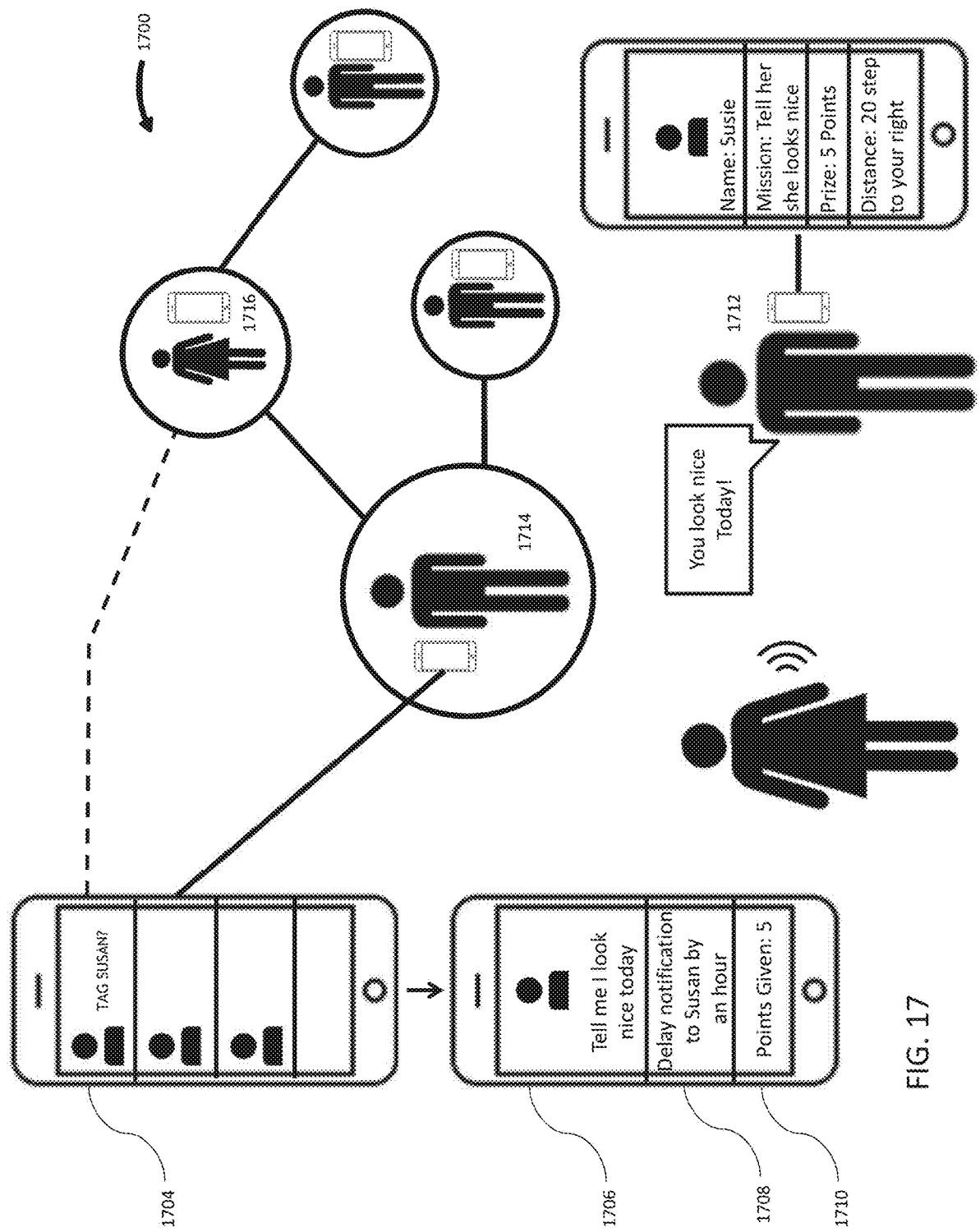
FIG. 17 is an environmental diagram illustrating an embodiment of the present disclosure capable of tagging moment files to a personal object (handy or the like) periodically moving with a user.

Turning next to FIG. 17, the system 100 may be utilized in a method 1700 to allow users 12 to tag other users 12 with moment file 102 content. The system may allow users to restrict moment file 102 content recording on the handy 104 location of another user (or the like) by group, content type, or the like. For example, a certain set of restrictions may allow a user in a group to tag 1704 another user 1716 in the group. Additionally another user 1714 in the group may view the moment 1706 tagged on a user in the group. A moment 1706 tag may also be viewable only after a delay 1708 from the time the tag was placed and provide a reward 1710 to a user 1712 that views and follows the instructions of the moment 1706. Generally, it is an object of the present invention to allow system 100 users 12 to control (restrict) moment files 102 posted about them, around them, on their property, by a particular user, group of users, and to otherwise restrict their participation with the system 100 and its users. Such restrictions may be free to users by moment file category, other user identity, moment file content, or the like (hate speech, speech designed to hurt a user or non-user, bullying, unwanted interactions, stalking, and the like are preferably controlled via the system 100 filter 106. Other acceptable but undesirable moment file 102 content may be restricted by (1) user participation level (higher utilization, measured, e.g., by moment file quality and content), or (2) by subscription. Users 12 may also control and designate members within their group, when and where they wish to be reminded of an available moment file 102 (do not notify [ping] while driving, at night, at work, in the theater, or the like). Users 12 may limit the radius of their interest to certain types of locations, users, geography, and the like.

Turning now to FIG. 18, a user interface for a multidimensional platform of the invention 100 (or the like) is illustrated. User interface icons 1800 may be displayed on a device such as a handy 104 (herein various handy 104 icons throughout the appended figures also signify fixed vehicle displays or heads-up-display (HUD) or the like), capable of operation in the system 100 as at least one or both of a moment recorder 200 and/or a moment reader 300.

Sample user interface icons 1800 for display are preferably representative of moment 10 content or subject. Users 12 may selectively sort, arrange, and categorize moments 10 (FIG. 2) they have read 300 or recorded 200. Additionally, the system 100 may provide sorting and categorization (e.g., FIG. 2 or the like) according to desired system 100 outcomes. For example, increasing usability, user participation and interest, according to a particular property holder's 1306 interest, or in accordance with some useful social goal (e.g., awareness of laws, dangers, and restrictions or the like). FIG. 18 illustrates an example sample set of moment icons 1800 for an embodiment of the present invention. For example temporary moments 1802 may be available to be read 200 (displayed and accessible) for a particular singular period of time or for a brief period of time on a reoccurring or randomly reoccurring basis according to a user 12, system 100, or holder 1306 goal. Additionally, moments 10 may signify an opportunity to chat 1804 with another user 12, the system, or a holder 1306. Moments 10 may also be grouped into families' or by category as signified by a single moment 10 user interface icon 1806. Such groupings may be established according to a particular user's 12 interests, by age, game playing field (serial or intersection game board tile/space) in an augmented reality user 12, holder 1306, or system 100 designed and/or administered game. For example, a requirement that a user 12 follow a particular path solving or achieving certain physical, mental, advertiser, or social tasks in order to achieve a particular goal (see, for example, FIG. 16). In another embodiment a key/password 1808 accessible moment 10 category may require an accomplishment or the like to obtain access to a moment 10. In such an embodiment or the like, sound 1810 moments 10 may be identified and characterized as containing a voice message, musical recording, or the like. Video or movie based moments 1812 (see also 218, 220 FIG. 2) and photograph based moments 1814 (see 214, FIG. 2) may also include a special interface icon 1800 moment file 10 designation. Users 12 may also design and utilize customized icons to designate their moment 10 content (an avatar or the like). Such customized icons may be available according to specified system 100 rules and or parameters.

FIG. 18 also illustrates other categories of sample moment 10 content which may or may not be available to all users 12. For example, a user 12 may be tagged with a moment 10 icon 1800 representing a personal message 1816 relevant to other users 12 or the like. In an operating embodiment of such a system 100, a user's handy 104 (vehicle or the like) might include an icon signifying some aspect or reputational value of such a user 12. Such a tagged user 12 might be tagged with a moniker or representation either positive or negative. Perhaps a particular user is a poor driver or doesn't obey traffic laws and or etiquette. In such a case they may be visible via a reader 300 of the system 100 wearing (designated by) a particularly designed icon 1800 representing a negative characteristic, e.g., litterer, speeder, thrasher or flamer, and the like; or a positive characteristic, e.g., expert, arbitrator, banker, employee, friend, redeemer, repairperson, troubleshooter, or the like. In one embodiment such a tagged user 12 could remove the tag only after demonstrating to the system 100 ameliorating conduct or the like (e.g., consistently obeying traffic rules, system 100 verified walking an area full of litter and then depositing the litter at a known refuse container or location). Likewise, positive monikers (tags) might be earned via ratings, moment recordings, training, and/or other system 100 designations or assignments. User location data may be required by the system 100 in order for a user to participate. Network-based, GNSS-based, handset-based, SIM-based, WiFi based, Vehicle to Vehicle (V2V), Automatic Vehicle Location (AVL), (iteris.com/cvria/html/applications/applications._html), or other and/or hybrid based handy (vehicle) 104 location tools may be employed.

As previously described in the description of FIG. 2, opinions 310 may include a negative content 1818 moment file 10, and/or a positive content 1820 moment file 10. Users 12 of the system 100 may also achieve an award 1822 moment file 10 generated by another user 12, a holder 1306, or the system in a location a user is known to frequent which awards the user 12 with a designation or chit or the like.

In other embodiments of the system 100 (FIG. 18) a user 12 may leave directions 1824 or allow a user to turn system 100 features ON/OFF by accessing (reading 300) a system menu 1826 moment file 10. A user's reputation 1830 (biography or the like) may be designated via an icon 1830 worn about a user in the augmented reality of the system 100. Some moments 10 may be time sensitive 1828 or recorded as a reminder of an appointment, road work, weather hazard or the like. Notes and/or instructions 1832 moment files 10 may be categorized and represented by a special icon 1800. Likewise a user 12 can leave a love note 1834 moment file 10 for a particular user at a special place (accessible at any time or at certain times). Dashboard moment files 1836 may be dispersed geographically providing users 12 with information about new features, changes, statistics, offers, and the like. Likewise, dashboard moments 1836 may provide a moment locator (moment radar) or clues relevant to a particular user/moment, class of user/moment, or the user/moment population.

So as to provide an enhanced social experience for users at least one embodiment may include drifting moments 10 designated by an icon 1838. Such moments may change location by time, user activity, holder 1306 requirements, or according to a pseudo-random operation of the system 100. In other embodiments, users may leave information or instructions designated with a special moment icon 1840. Such information may include the legacy of an historic building, or an acknowledgement of the location where a world record was set. In other embodiments, users 12 may leave moment files 10 asking questions of an unknown but more knowledgeable user, or a known user, or a user with special characteristics. Such question moments 10 may be designated a special moment icon 1842 ("Did anyone witness _____ on _____?"). Also available in a preferred embodiment of the system 100 are "easter egg" moments 10 (treasures) designated by an icon 1844 which provide user interest available from a holder 1306, another user 12, or the system 100 (specifically tailored for a particular user or the like). Other embodiments may include game or puzzle moments 10 designated by an icon 1846 where reading 300 such a moment may entitle a user to puzzle or game play (relevant to the geography, place or the like) where success earns chits or the like.

Cross-platform access may be provided by special 1848 moment content 10 allowing integration with users of other platforms or groups providing entertainment, tools, skills, or items valuable for trade in the system 100 or another platform.

As designated by an X 1850 representing a thing or object of real property 1852, personal property 1854 (stationary or a fixture 1854A or movable or portable 1854B), and virtual 1856, the system 100 may augment any of these forms of property with a user recordable/readable moment file 10.

Figure 19:
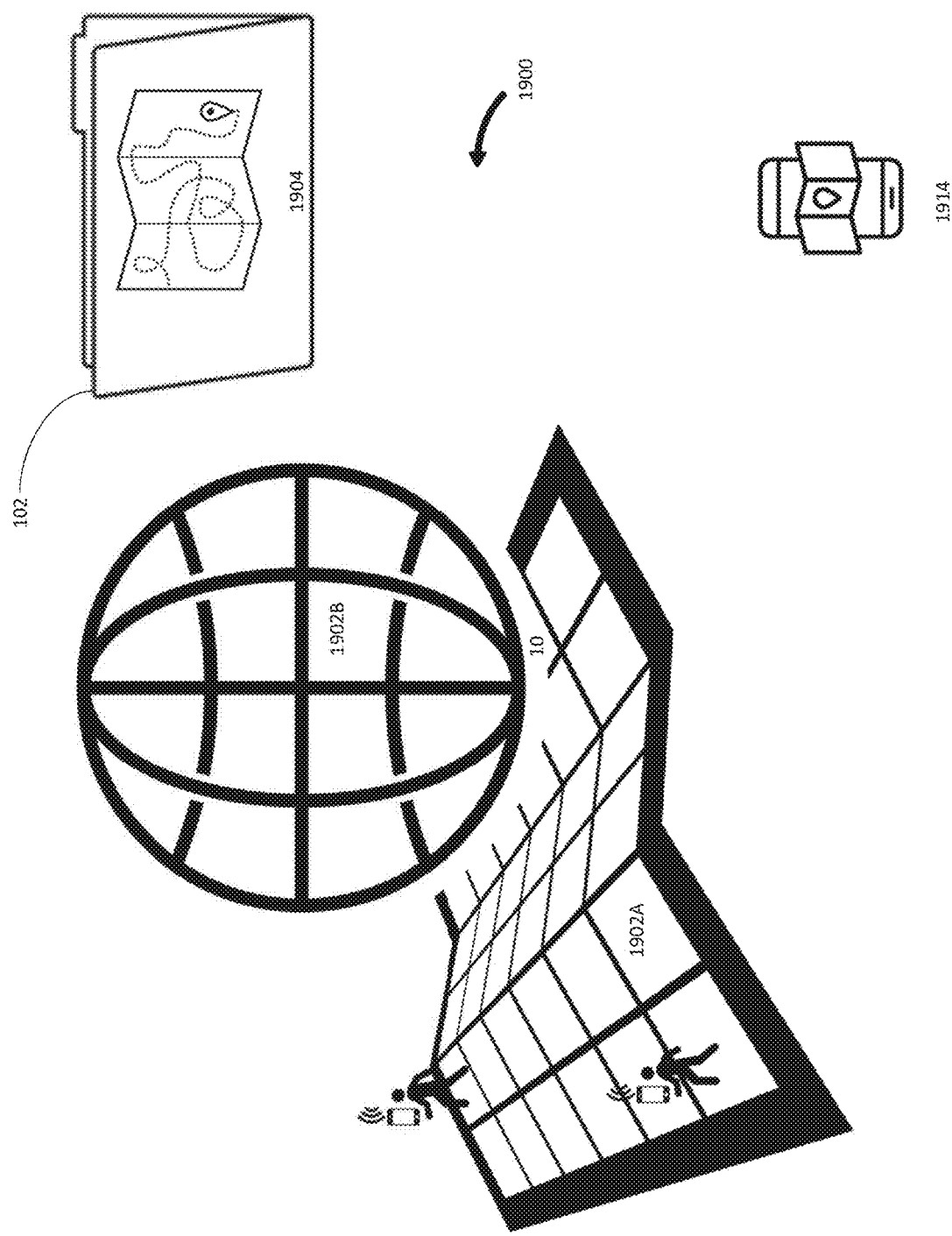
FIG. 19 is an environmental diagram illustrating a moment file based game for play on an unbounded or bounded augmented playing area based upon at least the real world and its real estate, the chattels distributed thereon, and a virtual space with or without defined boundaries.

Turning now to FIG. 19, a game player (user 12), a property holder 1306, the system 100, or the like may design a game 1900 with static rules, or rules which change according to time of day, day of week, player accomplishment, detours, player misdirection, or the like. A player 12 may be required to access u a series of moments 10 placed randomly or intelligently across a bounded 1902A or unbounded 1902B real (or real and virtual or real and augmented) area in a particular order with or without solving a physical, mental, or social problem characterized by recording a moment 10 or the like at a particular location within a given time period or at a particular step. A user 12 may use a game play handy 1914 or the like to participate in reading/recording (300/200) moment files 102 in accordance with game rules/instructions 1904 represented by a game play instruction icon 1904 moment file 102.

Figure 20:
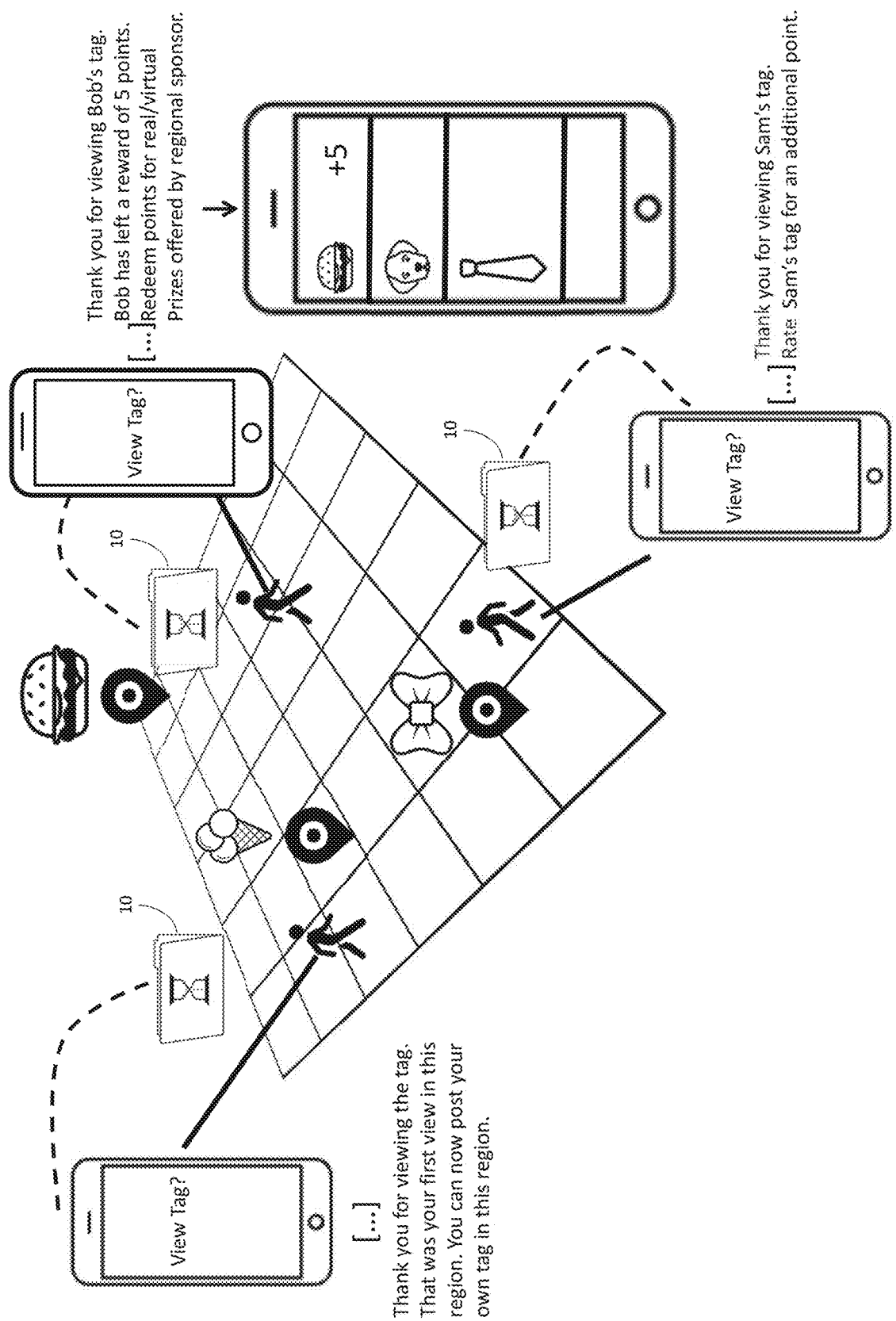
FIG. 20 is an environmental diagram of an awards system based upon a user characteristic such as participation as an embodiment of the present disclosure.

FIG. 20 illustrates a method of the system 100 for rewarding users 12 by how the user community rates a user's recorded moment 10 content.

Figure 21:
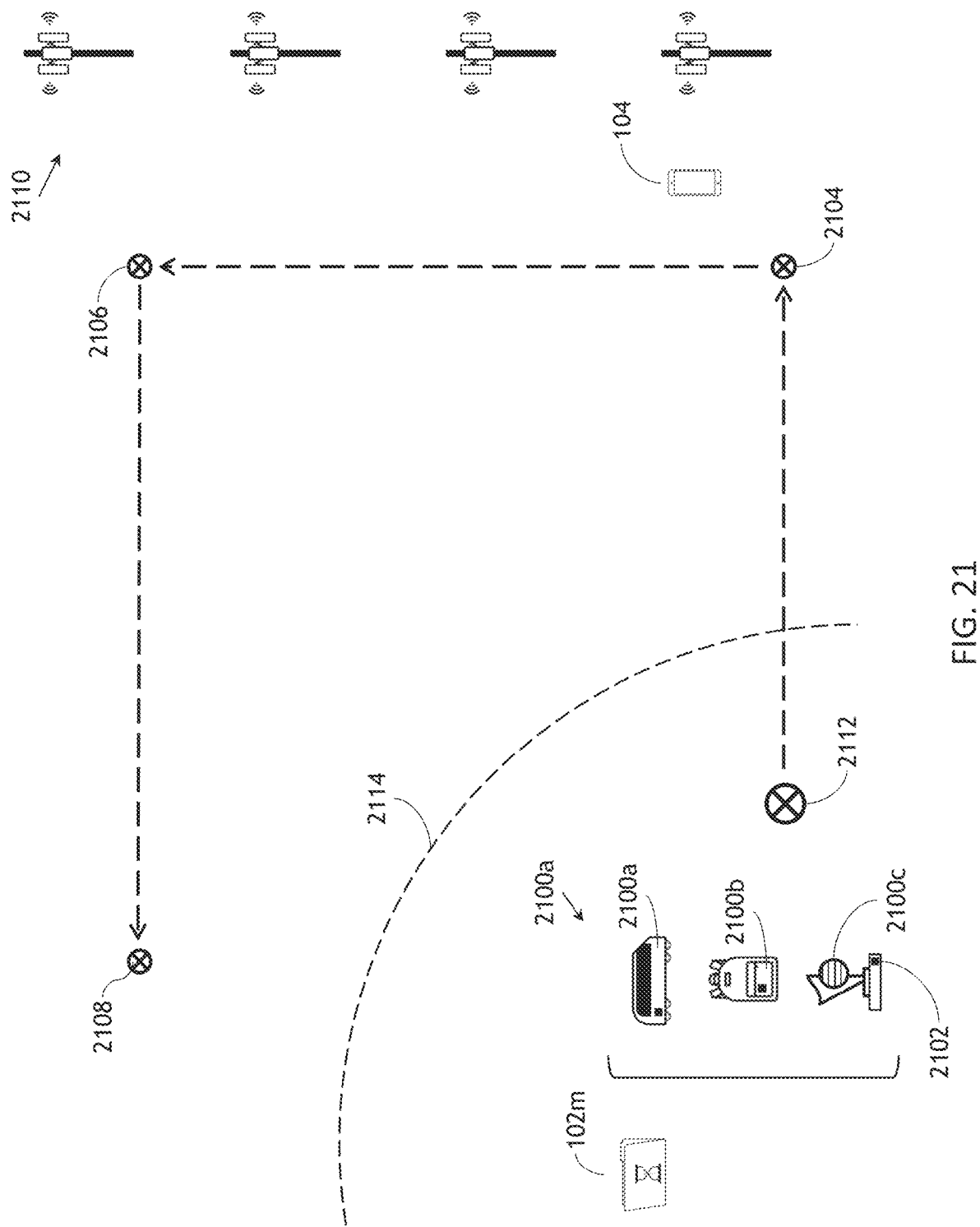
FIG. 21 is an environmental diagram of a mobile moment file according to embodiments of the present disclosure.

FIG. 21 illustrates a mobile moment file 102m of the system 100. The mobile moment file 102m may be implemented similarly to the moment files 102, 102a-k, except that the mobile moment file may be associated with a mobile target 2100, e.g., a vehicle 2100a, a personal accessory such as a backpack 2100b to be worn or carried while traveling, or a mobile object such as a sculpture 2100c that may be transported between, and exhibited at, a sequence of locations over time. For example, a beacon or tag 2102 may be attached to the mobile target 2100 and one or more mobile moment files 120m generated (e.g., including content and/or information relevant to the vehicle 2100a (e.g., its route, identifier, operator), the backpack 2100b or its wearer (e.g., personal information or content created by the wearer), or the sculpture 2100c (e.g., information about the sculpture and its creator/s, previous exhibits, etc.) based on the current location of the beacon/tag 2102. As the mobile target 2100 moves, or is transported, to new locations 2104, 2106, 2108 in turn, the moment pose (e.g., a position or location associated with the mobile moment file 102m and one or more desired orientations via which the mobile moment file may be accessed by a reading handy 104) may be updated to reflect the current location of the mobile target.

For example, the beacon/tag 2102 may include RF-enabled or like transceivers in communication with one or more networks or location services 2110 (e.g., cellular or GNSS networks, Bluetooth or other wireless networks, or location and tracking services and protocols (e.g., Tile, XYO, ADS-B). The beacon/tag 2102 may update the location and/or orientation of the mobile target 2100 at predetermined time intervals, or whenever new location information is available via networks/location services 2110. For example, the mobile target 2100 may be associated with a defined "home" location 2112, e.g., the vehicle 2100a may have a home station or a starting point for its designated route, the wearer of the backpack 2100b may program his/her mobile telephone to recognize his/her residence as "home", the sculpture 2100c may reside at a particular museum or gallery where it may be exhibited from time to time, or loaned out to other venues for exhibition.

A home location 2112 may be associated with a locus 2114 corresponding to an environment within which the home location may be found. For example, the locus 2114 may be defined as a radius around the home location 2112. Any reading handy 104 coming within the locus 2114 when the mobile target 2100 is at the home location 2112 may receive partial content associated with the mobile moment file 102m, e.g., guidance or directions for adjusting the reading handy to a pose (position/orientation) corresponding to the home location, or from where the mobile moment file 102m may be accessed in full, or challenges that must be solved (or conditions that must be met) before the mobile moment file 102m may be accessed. The beacon/tag 2102 may update the current location of the mobile target 2100 whenever received location data indicates that the mobile target 2100 is outside the locus 2114. Additionally or alternatively, the beacon/tag 2102 may be preprogrammed with a sequence of successive locations 2104, 2106, 2108 where the mobile target 2100 is expected to be at predetermined future times. The beacon/tag 2102 may thus automatically update the moment pose associated with the mobile moment file 102m at predetermined time intervals.

In various preferred embodiments and implementation of the invention both handy absolute and relative positioning sensors may be utilized. Comparison of position results may be utilized to generate one or more of a refined position and a refined orientation by resolving at least one position ambiguity associated with one or more of the initial position and the initial orientation to an achievable confidence level. The handy may include at least one of a vehicle, smart device, tablet, wearable device, head worn display (HWD), or other like portable electronic device.

A handy processor may generate (or record) a moment file preferably including moment position data (including at least a moment position, a moment orientation and a moment time) and recorder attributes corresponding to the enrolled handy recording the moment file or the moment file itself. Recorder attributes may include a recorder ID (uniquely identifying the recording handy or the recording individual) and recorder filters (e.g., filters or constraints introduced into the moment file by the recorder which determine the readers, or groups of readers, to which the moment file may be visible or accessible). Recorder filters may include a recorder permission, a moment age (or duration), a moment creation time, a moment medium, a moment subject or interest, and a moment theme. A recorded moment file may include elements of filterable content, e.g., an image or image stream, a video clip, a sound recording, a text file, a mood, a place, or an activity. A moment file may include augmented reality icons representative of one or more of the first moment file (or, e.g., its component content elements or its recorder). In a preferred implementation a system of the present disclosure will include a server for retrieving at least one augmented reality icon of a previously recorded moment file "placed" in its designated location, e.g., by being uploaded by the recorder to the server for potential access by other reading handys. For example, a reading handy may access a moment file based on the proximity of the handy's current location to a location associated with the moment file (depending on recorder-introduced or reader-introduced filters). If available positioning signals are diminished or intermittently transmitted, or ambiguities exist between positioning sensors of a handy, the handy processor may resolve these ambiguities to a given confidence level (and thereby determine proximity to a moment file) by, e.g., weighting a position source (absolute or relative) most likely to provide the greatest accuracy given the location of the last position reported. Accordingly, the enrolled handy may retrieve from the server (or other like cloud-based resource where generated augmented reality content is stored) an augmented reality icon corresponding to a moment file to be read during such periods of diminished, intermittent, or absent externally transmitted positioning signals.

Recorder filters and reader filters, respectively, may assist the user of a handy in filtering moment files according to a variety of characteristics, e.g., a reader permission; a moment age, creation time, medium, subject or interest, and theme. A recorder of a moment file may incorporate recorder filters into the moment file to restrict access to the moment file, while a reader may establish customizable reader filters specific to a handy to narrow the potential variety of accessible moment files according to reader interests. Readers may utilize a preferred enrolled handy to locate, retrieve, and view (via a display of the handy) moment files by interacting with the augmented reality icon or icons associated with the moment file. For example, proximity considerations, recorder filters, and reader filters may determine whether a given icon is displayed to a reader; the reader may then access other content elements of the file by interacting with (e.g., clicking) the icon.

Absolute and relative position sources of a handy may include, for example, a GNSS positioning system (GPS, GLONASS, Galileo, Beidou), a WiFi positioning system (WPS or WiPS/WFPS), a vehicle positioning system (VPS), a vehicle to vehicle positioning system (v2v), an inertial measurement unit (IMU) reporting at least one of relative position, orientation, velocity, and heading; a Received Signal Strength Indicator (RSSI) system; and/or a computer vision system configured for one or more of motion detection and area mapping. Preferably enrolled handy IMUs include a magnetometer, an accelerometer, a gyro sensor, and a gyroscope. Position data associated with a moment file may include a point in space, a point of origin, a waypoint, or a destination (e.g., if the moment file is recorded aboard, or intended to be read aboard, a moving vehicle). Such handy sensors may determine velocity as a change in position over time, e.g., to determine a locomotive source. For example, the locomotive source may be determined by an approximation of velocity and location (or a user reported locomotive source). Moment files may also include duration and a termination time; for example, the recorder may incorporate a duration time into the moment file, after which the moment file ceases to exist or is no longer accessible.

In filterably selecting moment file augmented reality icons for display on a user's handy, identifiers and filters (recorder-based or reader-based) may preferably include a character string and matrix, where each character and character position in the string or matrix is indicative of a characteristic of respective ones of a plurality of recorders, readers, and filters. Where such a string or matrix is utilized, the inclusion and position of must match characters, need not match characters, or wildcard character may indicate the theme, class, location, user, category, and location type of moment files to be displayed or not displayed.

In other preferred embodiments an enrolled handy may calculate position data of a moment file to be read or accessed as a defined locus to the moment file, whereby the handy processor may retrieve an augmented reality icon or icons of the moment file when the location of the handy corresponds to the defined locus. The defined locus may be, for example, a circle or freeform shape having a radius or other dimensions defined by the recorder.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

We claim:

1. A reading device for filterable content, comprising:
   a location and orientation system comprising at least one position sensor, the location and orientation system configured to determine a reader orientation of the device and a reader position of the device;
   at least one display unit configured to display to at least one reader one or more of:
      (1) an image associated with an environment proximate to the device, based on the reader orientation and the reader position; and
      (2) at least one interactive tag associated with a moment file, the interactive tag viewable with the image;
   and
   at least one processor coupled to the location and orientation system and to the at least one display unit, the at least one processor configured to:
      (1) determine an ability of the reader to access the moment file based on a reader position proximate to a moment position corresponding to the moment file and a reader orientation oriented toward the moment position;
      (2) determine an eligibility of the reader to access the moment file based on one or more criteria chosen from a reader filter associated with the reader and a recorder filter associated with a recorder of the moment file, the reader filter selected from a reader identifier unique to the reader and a reader interest;
      (3) when the reader is both able and eligible to access the moment file:
         (a) direct the at least one display unit to display the corresponding interactive tag based on the reader orientation, the reader position, and the moment position; and
         (b) direct the device to provide at least one alert to the reader, the alert corresponding to the moment file; and
      (4) when the reader successfully interacts with the at least one interactive tag, directing the at least one display unit to display to the reader one or more filterable content elements associated with the accessed moment file, the filterable content elements selected from an image, a video clip, a sound recording, a text file, a mood, a place, and an activity;
   wherein the at least one interactive tap includes at least one user interface icon associated with one or more of the reader identifier and the reader interest, the at least one user interface icon associated with a reputational aspect of a user, the user selected from the reader and at least one third party.

2. The reading device of claim 1, wherein the at least one position sensor is selected from:
   an absolute position sensor configured to determine an absolute position of the device based on one or more received positioning signals;
   and
   a relative position sensor configured to determine a relative position of the device.

3. The reading device of claim 2, wherein, when the absolute position sensor is unable to receive the one or more positioning signals, the relative position sensor is configured to determine the relative position relative to at least one absolute position determined by the absolute position sensor.

4. The reading device of claim 1, wherein the reader successfully interacts with the at least one interactive tag by a fee.

5. The reading device of claim 1, wherein:
   at least one the interactive tag includes information associated with the moment file;
   and
   the reader successfully interacts with the at least one interactive tag by directing the at least one processor to read the information.

6. The reading device of claim 1, wherein the moment position includes a locus wherein the moment position may be found.

7. The reading device of claim 6, wherein:
   the at least one interactive tag includes one or more guidance elements for reaching the moment position;
   and
   the at least one processor is configured to adjust one or more of the reader orientation and the reader position based on the guidance elements.

8. The reading device of claim 1, wherein:
   the moment file is a first moment file;
   and
   the one or more filterable content elements include one or more instructions for accessing at least one second moment file.

9. The reading device of claim 1, wherein:
   the at least one user interface icon is associated with at least one password,
   and
   the reader successfully interacts with the interactive tag by providing the password.

10. The reading device of claim 1, wherein:
    the at least one user interface icon is customizable by the reader.

11. The reading device of claim 1, wherein the reputational aspect is selected from a positive aspect and a negative aspect.

12. The reading device of claim 1, wherein:
the user is the reader;
and
the reputational aspect is removable upon the fulfillment of one or more ameliorative conditions by the reader.

13. The reading device of claim 1, wherein:
the at least one interactive tag includes at least one challenge;
and
the reader successfully interacts with the at least one interactive tag by responding to the at least one challenge.

14. The reading device of claim 1, wherein:
the at least one alert is selected from a ping and a haptic response.

15. A reading device for filterable content, comprising:
a location and orientation system comprising at least one position sensor, the location and orientation system configured to determine a reader orientation of the device and a reader position of the device;
at least one display unit configured to display to at least one reader one or more of:
  (1) an image associated with an environment proximate to the device, based on the reader orientation and the reader position; and
  (2) at least one interactive tag associated with a moment file, the interactive tag viewable with the image;
and
at least one processor coupled to the location and orientation system and to the at least one display unit, the at least one processor configured to:
  (1) determine an ability of the reader to access the moment file based on a reader position proximate to a first moment position corresponding to the moment file and a reader orientation oriented toward the moment position;
  (2) determine an eligibility of the reader to access the moment file based on one or more criteria chosen from a reader filter associated with the reader and a recorder filter associated with a recorder of the moment file, the reader filter selected from a reader identifier unique to the reader and a reader interest;
  (3) when the reader is both able and eligible to access the moment file:
    (a) direct the at least one display unit to display the corresponding interactive tag based on the reader orientation, the reader position, and the moment position;
    and
    (b) direct the device to provide at least one alert to the reader, the alert corresponding to the moment file;
  and
  (4) when the reader successfully interacts with the at least one interactive tag, directing the at least one display unit to display to the reader one or more filterable content elements associated with the accessed moment file, the filterable content elements selected from an image, a video clip, a sound recording, a text file, a mood, a place, and an activity;
wherein:
the at least one interactive tag includes at least one user interface icon associated with one or more of the reader identifier and the reader interest;
the moment position is a first moment position and:
the at least one user interface icon is associated with a drifting moment;
and
the first moment position is configured to shift to at least one second moment position.

* * * * *